(12) United States Patent
Ozturk et al.

(10) Patent No.: US 12,177,900 B2
(45) Date of Patent: *Dec. 24, 2024

(54) UPLINK LISTEN-BEFORE-TALK FAILURE RECOVERY

(71) Applicant: QUALCOMM INCORPORATED, San Diego, CA (US)

(72) Inventors: Ozcan Ozturk, San Diego, CA (US); Xiaoxia Zhang, San Diego, CA (US); Jing Sun, San Diego, CA (US); Andrei Dragos Radulescu, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,310

(22) Filed: Jan. 3, 2023

(65) Prior Publication Data

US 2023/0141800 A1    May 11, 2023

Related U.S. Application Data

(63) Continuation of application No. 17/090,641, filed on Nov. 5, 2020, now Pat. No. 11,553,523.
(Continued)

(51) Int. Cl.
*H04W 74/0808* (2024.01)
*H04L 5/00* (2006.01)
(Continued)

(52) U.S. Cl.
CPC ... *H04W 74/0808* (2013.01); *H04W 72/0453* (2013.01); *H04W 74/002* (2013.01);
(Continued)

(58) Field of Classification Search
CPC ......... H04W 74/0808; H04W 72/0453; H04W 74/008; H04W 74/0841; H04W 76/19;
(Continued)

(56) References Cited

U.S. PATENT DOCUMENTS 11,184,925 B2    11/2021  Babaei et al.
11,503,648 B2 *  11/2022  Babaei ............. H04W 74/0833
(Continued)

FOREIGN PATENT DOCUMENTS

| TW | 201937866 A | 9/2019 |
|----|----|----|
| WO | WO-2019168384 A1 | 9/2019 |
| WO | WO-2021128224 A1 | 7/2021 |

OTHER PUBLICATIONS

CATT: "Consideration on RACH Procedure and RLF", 3GPP Draft; 3GPP TSG RAN WG2 Meeting #68, 3GPP Draft, R2-096506, 3rd Generation Partnership Project (3GPP), Mobile Competence Centre, 650, Route Des Lucioles, F-06921 Sophia-Antipolis Cedex, France, No. Jeju, Korea, Nov. 9, 2009-Nov. 13, 2009, Nov. 9, 2009 (Nov. 9, 2009), XP050391093, 2 Pages [retrieved on Nov. 3, 2009] p. 2, lines 8-10.
(Continued)

*Primary Examiner* — Harry H Kim
(74) *Attorney, Agent, or Firm* — Holland & Hart LLP /Qualcomm Incorporated

(57) ABSTRACT

Methods, systems, and devices for wireless communications are described. A user equipment (UE) may identify a bandwidth part (BWP) to switch to after identifying consistent uplink listen-before-talk (LBT) failures on a first BWP based on parameters indicated by a base station. For example, the base station may transmit a switching parameter to the UE that the UE then uses to switch to a second BWP based on identifying the consistent uplink LBT failures on the first BWP. Subsequently, after selecting the second BWP, the UE may attempt to use the second BWP for uplink transmissions (e.g., after performing a random access procedure). Additionally, the UE may indicate the consistent uplink LBT failures to a base station associated with the failed BWP based on a type of cell that is using that failed BWP.

22 Claims, 18 Drawing Sheets

Related U.S. Application Data

(60) Provisional application No. 62/932,321, filed on Nov. 7, 2019.

(51) Int. Cl.
  *H04W 16/14* (2009.01)
  *H04W 72/0453* (2023.01)
  *H04W 74/00* (2009.01)
  *H04W 74/0833* (2024.01)
  *H04W 76/19* (2018.01)
  *H04W 80/02* (2009.01)

(52) U.S. Cl.
  CPC ....... *H04W 74/0841* (2013.01); *H04W 76/19* (2018.02); *H04W 80/02* (2013.01)

(58) Field of Classification Search
  CPC . H04W 80/02; H04W 16/14; H04W 74/0833; H04L 5/001; H04L 5/0098
  See application file for complete search history.

(56) References Cited

U.S. PATENT DOCUMENTS

| | | | | |
|---|---|---|---|---|
| 11,553,523 | B2* | 1/2023 | Ozturk | .................. H04W 80/02 |
| 2019/0253200 | A1 | 8/2019 | Salem et al. | |
| 2020/0053777 | A1* | 2/2020 | Babaei | .................. H04W 16/14 |
| 2021/0105096 | A1 | 4/2021 | Chin et al. | |
| 2021/0160927 | A1* | 5/2021 | Shi | .................... H04W 74/0816 |
| 2021/0168879 | A1 | 6/2021 | Jiang | |
| 2021/0194756 | A1* | 6/2021 | Babaei | .................. H04B 7/088 |
| 2021/0243808 | A1* | 8/2021 | Deenoo | ................. H04L 1/0001 |
| 2021/0282185 | A1 | 9/2021 | Xu et al. | |
| 2022/0022267 | A1 | 1/2022 | Shi et al. | |
| 2022/0053502 | A1* | 2/2022 | Wang | ................ H04W 28/0236 |
| 2022/0061094 | A1* | 2/2022 | Jung | ................. H04W 74/0816 |
| 2022/0070970 | A1* | 3/2022 | Zhou | ................. H04W 72/0446 |

OTHER PUBLICATIONS

Charter Communications: "Remaining Issues on Consistent LBT Failure Detection in NRU", 3GPP TSG-RAN WG2 Meeting #107bis, 3GPP Draft; R2-1913649 Remaining Issues on Consistent LBT Failure Detection in NRU, 3rd Generation Partnership Project (3GPP), Mobile Competence Centre; 650, Route Des Lucioles; F-06921 Sophia-Antip, vol. RAN WG2, No. Chongqing, China; Oct. 14, 2019-Oct. 18, 2019, Oct. 4, 2019 (Oct. 4, 2019), 5 Pages, XP051805117, section 1, section 2, section 2.1, section 2.3.

Interdigital: "Report of Offline 504: Summary of Discussion on UL LBT Failure", 3GPP RAN WG2 Meeting #107bis, 3GPP Draft; R2-1914054, 3rd Generation Partnership Project (3GPP), Mobile Competence Centre, 650, Route Des Lucioles, F-06921 Sophia-Antipolis Cedex, France, vol. RAN WG2, No. Chongqing, China; Oct. 14, 2019-Oct. 18, 2019, Oct. 18, 2019 (Oct. 18, 2019), 8 Pages, XP051797888, the whole document.

International Preliminary Report on Patentability—PCT/US2020/059320 The International Bureau of WIPO—Geneva, Switzerland, dated May 19, 2022.

International Search Report and Written Opinion—PCT/US2020/059320—ISA/EPO—dated Jan. 26, 2021.

Nokia., et al., "Remaining Issues on UL LBT", 3GPP TSG-RAN WG2 Meeting #107bis, 3GPP Draft; R2-1913287 Remaining Issues on UL LBT, 3rd Generation Partnership Project (3GPP), Mobile Competence Centre; 650, Route Des Lucioles; F-06921 Sophia-Antipolis Cedex; France, vol. RAN WG2, No. Chongqing, China; Oct. 14, 2019-Oct. 18, 2019, Oct. 3, 2019 (Oct. 3, 2019), 3 Pages, XP051804167, section 1, sections 2.1-2.3.

Taiwan Search Report—TW109138856—TIPO—Jun. 28, 2024.

Ericsson: "Handling LBT Failures", 3GPP TSG-RAN WG2 #107bis, Tdoc R2-1913504 (Revision of R2-1910779), Chongqing, China, Oct. 14-18, 2019, Oct. 3, 2019, 7 pages.

\* cited by examiner

UPLINK LISTEN-BEFORE-TALK FAILURE RECOVERY

CROSS REFERENCE TO RELATED APPLICATIONS

This application is a continuation of U.S. application Ser. No. 17/090,641, filed on Nov. 5, 2020, and entitled "UPLINK LISTEN-BEFORE-TALK FAILURE RECOVERY" and claims the benefit of U.S. Provisional Application Ser. No. 62/932,321, entitled "UPLINK LISTEN-BEFORE-TALK FAILURE RECOVERY" and filed on Nov. 7, 2019, the disclosure of which is incorporated herein by reference.

FIELD OF TECHNOLOGY

The following relates generally to wireless communications and more specifically to uplink listen-before-talk (LBT) failure recovery.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE and a base station may communicate on resources of an unlicensed band (e.g., NR unlicensed (NR-U) frequency bands). For example, the resources of the unlicensed band may be shared among multiple UEs (e.g., and multiple base stations), such that a UE may contend for one or more of these shared resources to communicate with the base station (e.g., performing contention-based procedures, such as a contention based random access procedure). Accordingly, a UE may check whether a channel in the unlicensed band (e.g., a set of frequency resources) is clear prior to attempting to communicate with a base station. In some cases, this check of whether the channel is clear may include a listen-before-talk (LBT) procedure, where the UE listens to the channel to determine whether any on-going transmissions are occurring prior to transmitting an uplink message to the base station (e.g., whether the channel is occupied or not prior to transmitting).

SUMMARY

The described techniques relate to improved methods, systems, devices, and apparatuses that support uplink listen-before-talk (LBT) failure recovery. Generally, the described techniques provide for a user equipment (UE) to receive a switching parameter from a base station indicating how the UE should react when consistent LBT failures are identified for a first bandwidth part (BWP). For example, the UE may use information conveyed in the switching parameter to switch to a second BWP based on identifying the consistent LBT failures on the first BWP. In some cases, the switching parameter may indicate one or more of: a number of BWP switches for the UE (e.g., a maximum number of switches the UE can perform, a minimum number of switches, fixed number of switches, etc.), whether a BWP can be switched to after a failure of another BWP, a priority order for BWPs to be switched to, a subband constraint for switching BWPs, whether a same BWP can be switched to multiple times, a maximum time between switching to the same BWP, or a combination thereof.

Based on the information indicated in the switching parameter by the base station, the UE may select or identify the second BWP and attempt to communicate with the base station using the second BWP. For example, the UE may perform a random access procedure (e.g., a random access channel (RACH) procedure) with the base station on the second BWP to establish a connection with the base station for subsequent communications. However, if the random access procedure fails or the UE experiences another consistent LBT failure on the second BWP, the UE may declare a radio link failure (RLF), switch to a third BWP, abort the random access procedure, or a combination thereof. Additionally or alternatively, if the UE identifies a consistent LBT failure on the first BWP or on the second BWP or on both, the UE may report an indication of the LBT failure (e.g., via a medium access control (MAC) control element (CE), a dedicated cause value message, a recovery procedure message, etc.) based on a type of cell that the LBT failure occurs upon (e.g., a primary cell (PCell), a secondary cell (SCell), a primary SCell (PSCell), etc.).

A method of wireless communications at a UE is described. The method may include receiving, from a base station, a BWP switching configuration message including a switching parameter; performing a set of LBT procedures for a first BWP; and switching to a second BWP for uplink communications with the base station based on the switching parameter and a number of failures associated with the set of LBT procedures for the first BWP.

An apparatus for wireless communications at a UE is described. The apparatus may include a processor, memory coupled with the processor, and instructions stored in the memory. The instructions may be executable by the processor to cause the apparatus to receive, from a base station, a BWP switching configuration message including a switching parameter; to perform a set of LBT procedures for a first BWP; and to switch to a second BWP for uplink communications with the base station based on the switching parameter and a number of failures associated with the set of LBT procedures for the first BWP.

Another apparatus for wireless communications at a UE is described. The apparatus may include means for receiving, from a base station, a BWP switching configuration message including a switching parameter; means for performing a set of LBT procedures for a first BWP; and means for switching to a second BWP for uplink communications with the base station based on the switching parameter and a number of failures associated with the set of LBT procedures for the first BWP.

A non-transitory computer-readable medium storing code for wireless communications at a UE is described. The code may include instructions executable by a processor to receive, from a base station, a BWP switching configuration message including a switching parameter; to perform a set of LBT procedures for a first BWP; and to switch to a second BWP for uplink communications with the base station based on the switching parameter and a number of failures associated with the set of LBT procedures for the first BWP.

Some examples of the method, apparatuses, and non-transitory computer-readable medium described herein may further include operations, features, means, or instructions for determining a number of BWP switches based on the switching parameter, where the switch to the second BWP is based on the number of BWP switches.

In some examples of the method, apparatuses, and non-transitory computer-readable medium described herein, the switching parameter may include an upper threshold number of BWP switches, a lower threshold number of BWP switches, a fixed number of BWP switches, or a combination thereof.

Some examples of the method, apparatuses, and non-transitory computer-readable medium described herein may further include operations, features, means, or instructions for selecting the second BWP based on the switching parameter.

In some examples of the method, apparatuses, and non-transitory computer-readable medium described herein, the switching parameter may include an indication of a BWP priority order, where selecting the second BWP is based on the BWP priority order.

In some examples of the method, apparatuses, and non-transitory computer-readable medium described herein, the switching parameter may include an indication of a subband constraint for the second BWP, where selecting the second BWP is based on the subband constraint.

In some examples of the method, apparatuses, and non-transitory computer-readable medium described herein, the second BWP may be wholly in a second subband different than a first subband of the first BWP, a subset of the second BWP may be in the second subband different than the first subband of the first BWP, or a combination thereof.

In some examples of the method, apparatuses, and non-transitory computer-readable medium described herein, the switching parameter may include an indication that switching to a same BWP multiple times is permissible, where selecting the second BWP is based on the indication.

Some examples of the method, apparatuses, and non-transitory computer-readable medium described herein may further include operations, features, means, or instructions for determining a time threshold for switching to the same BWP, where selecting the second BWP is based on a time between successive switches to the second BWP satisfying the time threshold.

Some examples of the method, apparatuses, and non-transitory computer-readable medium described herein may further include operations, features, means, or instructions for performing a random access procedure on the second BWP based on switching to the second BWP.

Some examples of the method, apparatuses, and non-transitory computer-readable medium described herein may further include operations, features, means, or instructions for transmitting a first message of the random access procedure; determining a threshold number of attempts for transmitting the first message has been satisfied; and declaring an RLF or switching to a third BWP or a combination thereof based on the threshold number of attempts for transmitting the first message being satisfied.

Some examples of the method, apparatuses, and non-transitory computer-readable medium described herein may further include operations, features, means, or instructions for determining a number of uplink LBT failures for the second BWP exceeds the threshold value; switching to a third BWP based on the number of uplink LBT failures for the second BWP exceeding the threshold value; and aborting the random access procedure on the second BWP.

Some examples of the method, apparatuses, and non-transitory computer-readable medium described herein may further include operations, features, means, or instructions for determining that the number of uplink LBT failures for the first BWP occur on a PSCell and transmitting a dedicated cause value for the number of uplink LBT failures for the first BWP in a secondary cell group (SCG) failure message.

In some examples of the method, apparatuses, and non-transitory computer-readable medium described herein, the dedicated cause value may include a number of switched BWPs attempted.

Some examples of the method, apparatuses, and non-transitory computer-readable medium described herein may further include operations, features, means, or instructions for determining that the number of uplink LBT failures for the first BWP occur on an SCell and transmitting a MAC CE indicating the uplink LBT failures on a PCell or an additional SCell.

In some examples of the method, apparatuses, and non-transitory computer-readable medium described herein, transmitting the MAC CE may include operations, features, means, or instructions for determining the SCell includes a set of BWPs that includes the first BWP and transmitting the MAC CE on an additional BWP in a different subband for the SCell than the first BWP.

Some examples of the method, apparatuses, and non-transitory computer-readable medium described herein may further include operations, features, means, or instructions for determining to switch to the second BWP based on the number of failures associated with the set of LBT procedures for the first BWP satisfying a threshold value.

Some examples of the method, apparatuses, and non-transitory computer-readable medium described herein may further include operations, features, means, or instructions for performing a master cell group (MCG) recovery procedure via a secondary node (SN) based on a determination that a number of uplink LBT failures for the second BWP satisfies the threshold value and that the number of uplink LBT failures for the second BWP occurs on a PCell.

In some examples of the method, apparatuses, and non-transitory computer-readable medium described herein, performing the MCG recovery procedure via the SN may include operations, features, means, or instructions for transmitting an indication of a failure for the PCell based on the number of uplink LBT failures for the second BWP exceeding the threshold value to the SN.

Some examples of the method, apparatuses, and non-transitory computer-readable medium described herein may further include operations, features, means, or instructions for performing one or more LBT procedures for the second BWP and switching to a third BWP according to the BWP switching configuration and the switching parameter based on a number of failures associated with the one or more LBT procedures for the second BWP.

A method of wireless communications at a base station is described. The method may include transmitting, to a UE, a BWP switching configuration message including a switching parameter; receiving, from the UE, a first uplink transmission in a first BWP; and receiving, from the UE, an uplink transmission in a second BWP based on the switching parameter and an uplink LBT failure.

An apparatus for wireless communications at a base station is described. The apparatus may include a processor, memory coupled with the processor, and instructions stored in the memory. The instructions may be executable by the processor to cause the apparatus to transmit, to a UE, a BWP switching configuration message including a switching parameter; to receive, from the UE, a first uplink transmission in a first BWP; and to receive, from the UE, an uplink transmission in a second BWP based on the switching parameter and an uplink LBT failure.

Another apparatus for wireless communications at a base station is described. The apparatus may include means for transmitting, to a UE, a BWP switching configuration message including a switching parameter; means for receiving, from the UE, a first uplink transmission in a first BWP; and means for receiving, from the UE, an uplink transmission in a second BWP based on the switching parameter and an uplink LBT failure.

A non-transitory computer-readable medium storing code for wireless communications at a base station is described. The code may include instructions executable by a processor to transmit, to a UE, a BWP switching configuration message including a switching parameter; to receive, from the UE, a first uplink transmission in a first BWP; and to receive, from the UE, an uplink transmission in a second BWP based on the switching parameter and an uplink LBT failure.

Some examples of the method, apparatuses, and non-transitory computer-readable medium described herein may further include operations, features, means, or instructions for receiving, from the UE, a dedicated cause value for a number of uplink LBT failures for the first BWP in an SCG failure message, where the dedicated cause value includes a number of switched BWPs attempted.

Some examples of the method, apparatuses, and non-transitory computer-readable medium described herein may further include operations, features, means, or instructions for receiving, from the UE, a MAC CE indicating a number of uplink LBT failures for the first BWP on a PCell or an SCell.

In some examples of the method, apparatuses, and non-transitory computer-readable medium described herein, the MAC CE may be received on an additional BWP in a different subband for the SCell than the first BWP.

Some examples of the method, apparatuses, and non-transitory computer-readable medium described herein may further include operations, features, means, or instructions for receiving, from an SN, an indication of a failure for a PCell based on a number of uplink LBT failures for the first BWP exceeding a threshold value.

In some examples of the method, apparatuses, and non-transitory computer-readable medium described herein, the switching parameter may include a number of BWP switches, an indication of which BWP can be switched to after a failure of another BWP, a priority order for a set of BWPs in the BWP switching configuration message, an indication for switching to a BWP in a different subband, an indication that a same BWP can be used multiple times for switching, a threshold time between switching to the same BWP, or a combination thereof.

DETAILED DESCRIPTION

Figure 1:
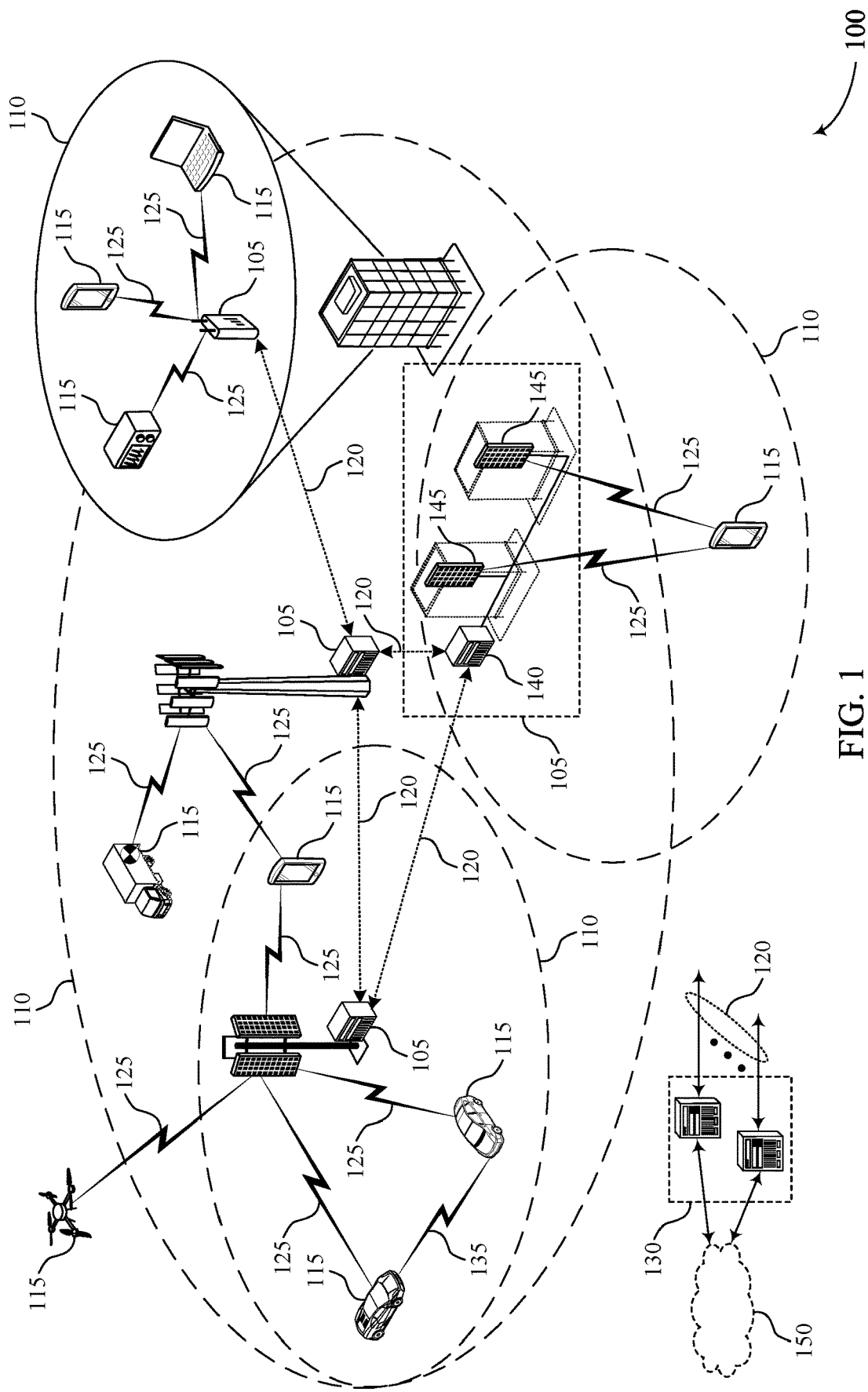
FIG. 1 illustrates an example of a system for wireless communications that supports uplink listen-before-talk (LBT) failure recovery in accordance with aspects of the present disclosure.

In some wireless communications systems (e.g., New Radio unlicensed (NR-U) bands), a UE may perform a listen-before-talk (LBT) procedure to determine if a channel is unoccupied for uplink transmissions and may transmit an uplink transmission after determining the LBT procedure is successful (e.g., the channel is clear). For a dual connectivity configuration (e.g., or carrier aggregation configuration), if the UE detects consistent failures for an LBT procedure on a current uplink bandwidth part (BWP) (e.g., a number of LBT procedures fail that exceed a configured number of attempts) on a primary cell (PCell) (e.g., or a primary secondary cell (PSCell)), the UE may switch to another BWP for recovery. However, some techniques for switching to another BWP may not include parameters for the switching. For example, the UE may attempt to switch to a BWP in a same subband as the failed BWP, may attempt to switch to a BWP in an adjacent subband as the failed BWP, or may attempt to switch to a same BWP tried earlier and had already previously failed. As such, the UE may inefficiently try different BWPs before finding a clear channel to use for uplink transmissions, which may increase latency and delay the uplink transmissions unnecessarily.

As described herein, a base station (or the network) may indicate different parameters (e.g., a switching parameter) for the UE to switch between different BWPs based on identifying consistent LBT failures for a BWP. For example, the base station may indicate a number of BWP switches for the UE (e.g., a maximum number of switches the UE can perform, a minimum number of switches, a fixed number of switches, etc.), whether a BWP can be switched to after a failure of another BWP, a priority order for BWPs to be switched to, switching to a BWP in a different subband than the failed BWP, whether a same BWP can be switched to multiple times, a maximum time between switching to the same BWP, or a combination thereof. Accordingly, based on the information indicated with the switching parameter(s) from the base station, the UE may select or identify a second BWP and attempt to communicate with the base station using the second BWP.

In some cases, the UE may then perform a random access procedure (e.g., a random access channel (RACH) procedure) on the second BWP (e.g., BWP that the UE switched to). If a RACH failure occurs on the second BWP, the UE may declare a radio link failure (RLF) or switch to a different BWP (e.g., a third BWP). Additionally, if the UE identifies a consistent LBT failure on the second BWP, the UE may switch to a different BWP and abort RACH on the second BWP. In some cases, if the consistent LBT failures occur on a PSCell, the UE may signal a dedicated cause value (e.g., including a number of switched BWPs) in a secondary cell group (SCG) failure message for the PSCell. Additionally or alternatively, if the consistent LBT failures occur on a BWP in a secondary cell (SCell) (e.g., for a dual connectivity or carrier aggregation configuration), the UE may transmit a medium access control (MAC) control element (CE) on a PCell, an additional SCell, or on an additional BWP for the SCell. Additionally or alternatively, if the consistent LBT failures occur on the PCell, the UE may perform a master cell group (MCG) recovery through a secondary node (SN) (e.g., secondary base station) that forwards the recovery to the base station (e.g., master node (MN), PCell, etc.).

Aspects of the disclosure are initially described in the context of wireless communications systems. Additionally, aspects of the disclosure are illustrated through a BWP switching configuration, an additional wireless communications system, and a process flow. Aspects of the disclosure are further illustrated by and described with reference to apparatus diagrams, system diagrams, and flowcharts that relate to uplink LBT failure recovery.

FIG. 1 illustrates an example of a wireless communications system 100 that supports uplink LBT failure recovery in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on FDD, TDD, or a combination of both.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some wireless communications systems, a UE 115 may support carrier aggregation or dual connectivity or both, where the UE 115 communicates with multiple cells simultaneously. For example, the UE may communicate with a first base station 105 (e.g., a PCell)) and with a second base station 105 (e.g., an SCell) at the same time. Additionally or alternatively, a single base station 105 may include multiple cells (e.g., both a PCell and an SCell), where the UE 115 communicates with two or more cells on the single base station 105 at the same time. In some cases, one or more of the cells may be grouped into a PCell group (e.g., an MCG), which may include the PCell and one or more SCells. Additionally, one or more SCells may be grouped into an SCell group (e.g., an SCG). In some cases, a PSCell may be configured for the one or more SCells. Communications on each cell group may be independent of each other.

For communications between a UE 115 and a base station 105, an available bandwidth of frequencies for the communications may be split into BWPs that are subsets of the available bandwidth of frequencies. A BWP may be a bandwidth where the UE 115 can transmit and receive information. In conventional systems, a maximum number of four (4) BWPs may be configured to the UE 115. In some cases, the UE 115 may monitor a single, active BWP at a time (e.g., on a PCell). Additionally, on an SCell, the UE 115 may have multiple active BWPs at a given time.

In some cases, a carrier may be split into the one or more BWPs based on the size of the carrier exceeding a bandwidth threshold (e.g., greater than 20 MHz). Each of the BWPs may further include one or more sub-channels (e.g., sub-bands), where each sub-channel is a same bandwidth (e.g., 20 MHz). Accordingly, each BWP may vary in size (e.g., in multiples of 20 MHz) based on the number of sub-channels located in each. The BWPs and corresponding sub-channels may be part of a shared radio frequency (RF) spectrum (e.g., an unlicensed or shared licensed spectrum, such as NR-U) for which one or more wireless devices (e.g., base stations 105 and UEs 115) contend. A wireless device (for example, a base station 105, a UE 115, etc.) may determine which sub-channels are available for communications with other wireless devices based on an LBT procedure that indicates if on-going communications are present on each of the sub-channels.

For example, prior to transmitting the one or more uplink signals, a UE 115 may perform an LBT (e.g., an LBT procedure, a clear channel assessment (CCA), etc.) based on communicating with base station 105 in an unlicensed band (e.g., unlicensed frequency band, NR-U, etc.). In some cases, the LBT may include the UE 115 listening to uplink resources (e.g., indicated by an uplink grant from the base station 105) for transmitting one or more uplink signals to determine whether the channel is clear before attempting to transmit on the uplink resources. Accordingly, if the UE 115 detects a signal (e.g., above a threshold power value, for example) on the uplink resources during the LBT, the UE 115 may refrain from transmitting the uplink signals. Alternatively, if the UE 115 does not detect a signal, the UE 115 may determine the LBT is successful and may proceed with transmitting the uplink signals.

Accordingly, in some wireless communications system (e.g., NR-U), the UE 115 may perform an LBT for uplink transmissions and may transmit the uplink transmissions after LBT is successful. In some cases, a detection and recovery mechanism may be used by the UE 115 when consistent uplink LBT failures happen. The consistent uplink LBT failure may be considered a triggering event for the UE 115 based on a number of consecutive LBT failures occurring in a row (e.g., a configurable number of consecutive LBT failures indicated to the UE 115, such as by a base station 105 via RRC signaling, or preconfigured in the UE 115). For example, for a primary cell (e.g., PCell or PSCell), if the UE 115 detects consistent LBT failures on an existing uplink BWP being monitored or intended to be used by the UE 115, the UE 115 may switch to another BWP for recovery.

As part of this detection and recovery mechanism, the MAC layer (e.g., and additional upper layers) may rely on reception of a notification of an uplink LBT failure from the physical layer to detect a consistent uplink LBT failure. Subsequently, the UE 115 may switch to another BWP and may initiate a RACH procedure (e.g., random access procedure) upon declaration of the consistent LBT failure on a PCell or a PSCell if there is another BWP with configured RACH resources (e.g., physical RACH (PRACH) resources). In some cases, the UE shall perform an RLF recovery if the consistent uplink LBT failure was detected on the PCell and an uplink LBT failure was detected on N possible BWPs. Additionally or alternatively, when consistent uplink LBT failures are detected on the PSCell, the UE 115 may inform a MN (e.g., base station 105) of the consistent uplink LBT failures via an SCG failure information procedure after detecting the consistent uplink LBT failures on N BWPs. In some cases, N may represent a number of configured BWPs with configured PRACH resources for the UE 115 to use. For example, N may be indicated to the UE 115 by a base station 105 (e.g., MN, scheduling base station 105, etc.). If N is larger than one (1), the UE 115 may select a next BWP for switching based on UE implementation. Additionally, when consistent uplink LBT failures are detected on an SCell, the UE 115 may transmit a MAC CE to report the consistent uplink LBT failures to a node where the SCell belongs (e.g., secondary base station, SN, etc.).

However, with the detection and recovery mechanism as described previously, no parameters are indicated to the UE 115 for the BWP switching, and determining which BWP to switch to is left up to the UE 115. For example, the UE 115 may attempt to switch to a BWP in a same subband as the failed BWP, may attempt to switch to a BWP in an adjacent subband as the failed BWP, or may attempt to switch to a same BWP tried earlier and had already previously failed. As such, the UE may inefficiently try different BWPs with a higher chance of also failing before finding a clear channel to use for uplink transmissions, which may increase latency and delay the uplink transmissions unnecessarily.

Wireless communications system 100 may include efficient techniques for a UE 115 to identify a BWP to switch to after identifying consistent uplink LBT failures on a first BWP based on parameters indicated by a base station 105. For example, the base station 105 may transmit a switching parameter to the UE 115 that the UE 115 then uses to switch to a second BWP based on identifying the consistent uplink LBT failures on the first BWP. In some cases, the switching parameter may include a number of BWP switches for the UE 115 (e.g., a maximum number of switches the UE 115 can perform, a minimum number of switches, fixed number of switches, etc.), whether a BWP can be switched to after a failure of another BWP, a priority order for BWPs to be switched to, switching to a BWP in a different subband than the failed BWP, whether a same BWP can be switched to multiple times, a maximum time between switching to the same BWP, or a combination thereof. Subsequently, after selecting the second BWP, the UE 115 may attempt to use the second BWP for sending uplink transmissions to the base station 105 (e.g., after performing a RACH procedure). Additionally, the UE 115 may transmit an indication of the consistent uplink LBT failures to a base station 105 associated with the failed BWP based on a type of cell that is using that failed BWP.

Figure 2:
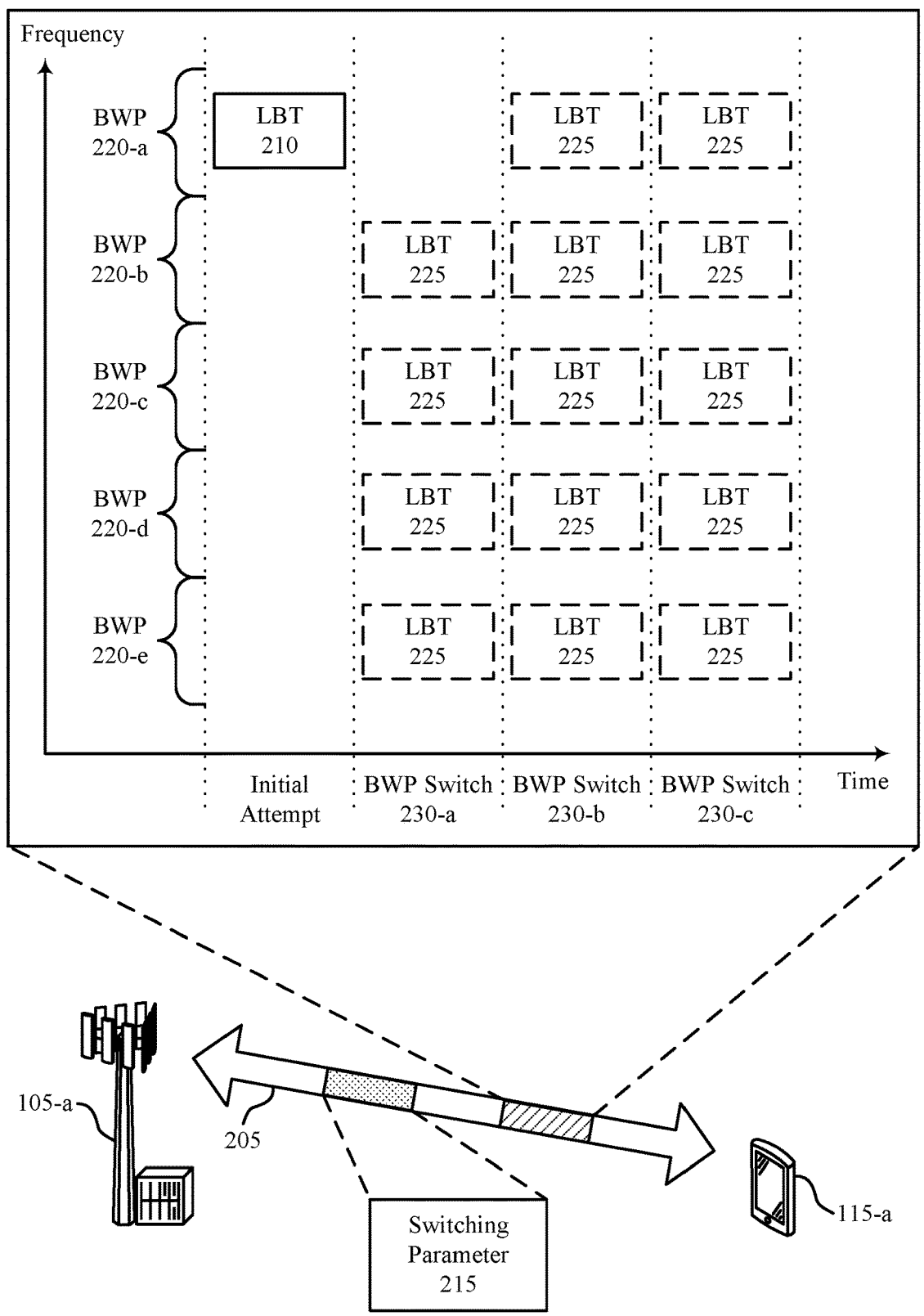
FIG. 2 illustrates an example of a bandwidth part (BWP) switching configuration that supports uplink LBT failure recovery in accordance with aspects of the present disclosure.

FIG. 2 illustrates an example of a BWP switching configuration 200 that supports uplink LBT failure recovery in accordance with aspects of the present disclosure. In some examples, BWP switching configuration 200 may implement aspects of wireless communications system 100. For example, BWP switching configuration 200 may include a base station 105-*a* and a UE 115-*a*, which may be examples of corresponding base stations 105 and UEs 115, respectively, as described with reference to FIG. 1. In some cases, base station 105-*a* and UE 115-*a* may communicate on resources of a carrier 205. Additionally, carrier 205 may include resources in an unlicensed band (e.g., NR-U communications), and the resources may be divided into one or more BWPs 220 as described herein.

In some cases, based on communicating in the unlicensed band, UE 115-*a* may perform an LBT 210 in an initial attempt to determine whether resources are available in a first BWP 220-*a* of carrier 205 prior to transmitting uplink messages to base station 105-*a*. However, the resources may be occupied and may be used by another UE 115, a base station 105, or an additional wireless device. For example, UE 115-*a* may determine a consistent uplink LBT failure is occurring on first BWP 220-*a* based on a number of consecutive LBT failures satisfy a threshold value. In some cases, this threshold value for the number of consecutive LBT failures to be considered a consistent uplink LBT failure may be configurable and indicated to UE 115-*a* by base station 105-*a* (e.g., via RRC signaling) or may be preconfigured in UE 115-*a*. Accordingly, after identifying the consistent LBT failure on first BWP 220-*a*, UE 115-*a* may switch to a different BWP 220 and attempt a subsequent LBT 225 on this different BWP 220.

Rather than leaving the determination up to UE implementation for determining which BWP 220 to switch to, base station 105-*a* may transmit a switching parameter 215 to UE 115-*a*. UE 115-*a* may then use information included in switching parameter 215 to perform a BWP switch 230 and for determining a next BWP 220 to switch to and attempt to communicate with base station 105-*a*. In some cases, the number of BWPs 220 available for UE 115-*a* to switch to (N) may be indicated to UE 115-*a* by base station 105-*a*. As described herein, N may represent a number of configured BWPs 220 with configured PRACH resources for the UE 115 to use. While five (5) BWPs 220 are shown in FIG. 2 (e.g., N=5 with first BWP 220-*a*, a second BWP 220-*b*, a third BWP 220-*c*, a fourth BWP 220-*d*, and a fifth BWP 220-*e*), the number of BWPs 220 may be higher or lower than five (5). Additionally, while the five (5) BWPs 220 are shown to be consecutive in the frequency domain (e.g., each BWP 220 appears to abut another BWP 220), it is to be understood that the BWPs 220 may be spread out among the resources of the unlicensed band of carrier 205.

In some cases, switching parameter 215 may indicate a configured number of BWP switches 230 for UE 115-*a*. For example, the number of BWP switches 230 may represent a maximum number (e.g., upper threshold) of BWP switches 230 that UE 115-*a* can perform (e.g., before determining an RLF), a minimum number (e.g., lower threshold) of BWP switches 230 for UE 115-*a* to perform, or a fixed number of BWP switches 230 for UE 115-*a*. If the number of BWP switched 230 is not included in switching parameter 215 (e.g., not configured), UE 115-*a* may determine a number of BWP switches 230 to perform and that can be performed autonomously. As shown in the example of FIG. 2, the number of BWP switches 230 may be three (3) (e.g., a first BWP switch 230-*a*, a second BWP switch 230-*b*, and a third BWP switch 230-*c*).

Additionally or alternatively, switching parameter 215 may indicate whether a BWP 220 can be switched to after a consistent uplink LBT failure is identified on another BWP 220. For example, switching parameter 215 may indicate that UE 115-*a* can use third BWP 220-*c* after a consistent uplink LBT failure is identified on first BWP 220-*a*. Additionally or alternatively, switching parameter 215 may indicate multiple BWPs 220 that UE 115-*a* can use after a consistent uplink LBT failure is identified on first BWP 220-*a*, and UE 115-*a* then may choose one of the multiple BWPs 220 to use (e.g., based on additional information included in switching parameter 215, based on UE implementation, etc.). For example, switching parameter 215 may indicate that UE 115-*a* can use third BWP 220-*c*, fourth BWP 220-*d*, or fifth BWP 220-*e* after a consistent uplink LBT failure is identified on first BWP 220-*a*, and UE 115-*a* may select fourth BWP 220-*d* to use as part of first BWP switch 230-*a*.

In some cases, switching parameter 215 may indicate one or more BWPs 220 that UE 115-*a* cannot use after consistent uplink LBT failure is identified on another BWP 220, and UE 115-*a* may determine to switch to a BWP 220 not indicated. Additionally or alternatively, switching parameter 215 may indicate, for each of the N BWPs 220, whether each BWP 220 can be switched to after a failure of the other BWPs 220. In some cases, switching parameter 215 may include a configuration of a priority order to use for each BWP 220. Accordingly, UE 115-*a* may switch to a BWP 220 based on which BWP 220 has a highest priority.

Additionally or alternatively, switching parameter 215 may include an indication of a subband constraint for a BWP switch 230. For example, the indication may include a constraint that a BWP 220 selected for a BWP switch 230 is to be in a different subband than the BWP 220 where the consistent uplink LBT failure was identified. For example, after identifying the consistent uplink LBT failure in first BWP 220-*a* that is part of a first subband, UE 115-*a* may select a BWP 220 for a BWP switch 230 that is in a subband different than the first subband of which first BWP 220-*a* is a part. In some cases, the subband constraint may indicate for UE 115-*a* to start with a farthest subband away from the first subband (e.g., UE 115-*a* may select fifth BWP 220-*e* for first BWP switch 230-*a* based on fifth BWP 220-*e* being in a subband farthest away from a subband of first BWP 220-*a*). Additionally, either the whole BWP 220 used for the BWP switch 230 or a subset of the BWP 220 used for the BWP switch 230 may be in a different subband than the subband(s) of first BWP 220-*a* where the consistent uplink BWP failure happened.

Additionally or alternatively, switching parameter 215 may include a configuration of whether a BWP 220 or a particular BWP 220 can be switched multiple times (e.g., an indication that switching to a same BWP 220 multiple times is permissible). For example, after performing first BWP switch 230-*a*, UE 115-*a* may attempt to access first BWP 220-*a* again in a subsequent BWP switch (e.g., second BWP switch 230-*b*, third BWP switch 230-*c*, etc.) based on an indication that first BWP 220-*a* can be switched to multiple times. Additionally or alternatively, UE 115-*a* may refrain from switching to a BWP 220 that has already been switched to or monitored previously based on this indication. In some cases, switching parameter 215 may further include a configuration of a maximum time (e.g., time threshold) between switching to a same BWP. For example, UE 115-*a* may select a BWP 220 for a BWP switch 230 based on a time between successive switches to that BWP 220 satisfying the time threshold. That is, the time threshold may represent a time that UE 115-*a* must wait before attempting to switch to a same BWP 220 again after a previous attempt to switch to that same BWP 220 was unsuccessful.

As shown, after performing a BWP switch 230, UE 115-*a* may perform an LBT 225 on the selected (e.g., switched) BWP 220 to determine whether the selected BWP 220 is available for subsequent communications with base station 105-*a*. If the LBT 225 is unsuccessful on the selected BWP 220, UE 115-*a* may perform a subsequent BWP switch 230 (e.g., based on the number of BWP switches 230 included in switching parameter 215 or determined by UE 115-*a*). In addition to or rather than performing the LBT 225 on the selected BWP 220, UE 115-*a* may attempt to access the selected BWP 220 to communicate with base station 105-*a* (e.g., via a random access or RACH procedure).

Figure 3:
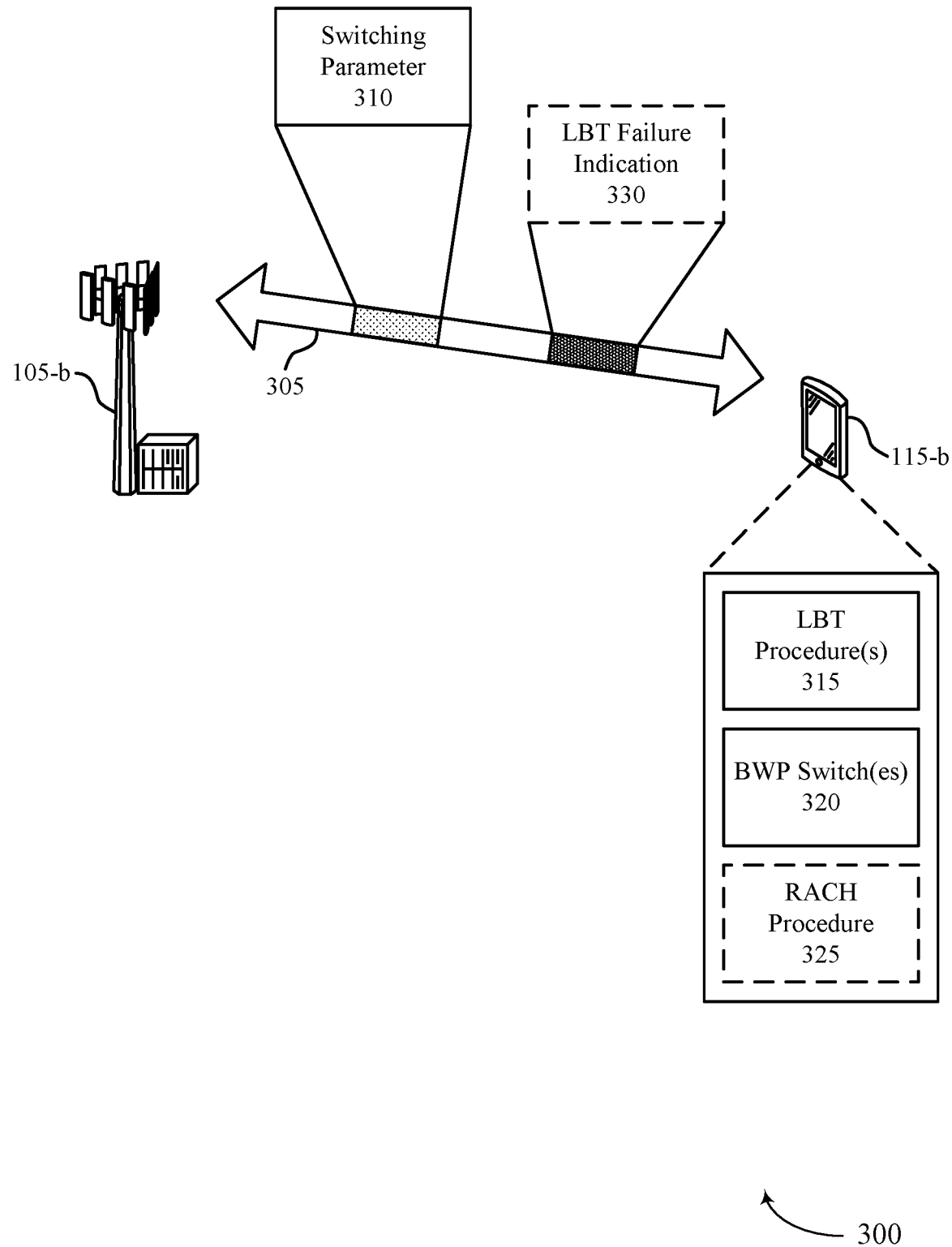
FIG. 3 illustrates an example of a wireless communications system that supports uplink LBT failure recovery in accordance with aspects of the present disclosure.

FIG. 3 illustrates an example of a wireless communications system 300 that supports uplink LBT failure recovery in accordance with aspects of the present disclosure. In some examples, wireless communications system 300 may implement aspects of wireless communications systems 100 and BWP switching configuration 200. For example, wireless communications system 300 may include a base station 105-*b* and a UE 115-*b*, which may be examples of corresponding base stations 105 and UEs 115, respectively, as described with reference to FIGS. 1 and 2. In some cases, base station 105-*b* and UE 115-*b* may communicate on resources of a carrier 305. Additionally, carrier 305 may include resources in an unlicensed band (e.g., NR-U communications), and the resources may be divided into one or more BWPs as described with reference to FIGS. 1 and 2.

Additionally, as described with reference to FIG. 2, base station 105-*b* may transmit a switching parameter 310 to UE 115-*b* for UE 115-*b* to determine and select a BWP for switching to based on identifying a consistent uplink LBT failure on a first BWP. For example, UE 115-*b* may perform one or more LBT procedure(s) 315 on the first BWP and determine that the first BWP is unavailable based on an identified consistent uplink LBT failure (e.g., a number of failures associated with the set of LBT procedures 315 for the first BWP satisfies a threshold value). Accordingly, UE 115-*b* may then perform one or more BWP switches 320 based on the information in switching parameter 310 to select a new BWP (e.g., switched BWP) for attempting to connect with base station 105*b*.

In some cases, UE 115-*b* may perform a RACH procedure 325 (e.g., random access procedure) on the new BWP if the failed BWP is within or on a PCell or a PSCell (e.g., of a dual connectivity or carrier aggregation configuration). For example, the RACH procedure 325 may include UE 115-*b* transmitting a RACH preamble (e.g., a message 1 (Msg1) in a four-step RACH or random access procedure) to base station 105-*b*. In some cases, the RACH preamble may be randomly selected from a set of 64 predetermined sequences. This random selection may enable base station 105-*b* to distinguish between multiple UEs 115 trying to access the system simultaneously. Base station 105-*b* may respond with a random access response (RAR) (e.g., a second message (Msg2)) that provides an uplink resource grant, a timing advance, and a temporary cell radio network temporary identifier (C-RNTI). UE 115-*b* may then transmit an RRC connection request (e.g., a third message (Msg3)) along with a temporary mobile subscriber identity (TMSI) (if the UE 115 has previously been connected to the same wireless network) or a random identifier. The RRC connection request may also indicate the reason UE 115-*b* is connecting to the network (e.g., emergency, signaling, data exchange, etc.). Base station 105-*b* may respond to the connection request with a contention resolution message (e.g., a fourth message (Msg4)) addressed to UE 115-*b*, which may provide a new C-RNTI. If UE 115-*b* receives a contention resolution message with the correct identification, UE 115-*b* may proceed with RRC setup. If UE 115-*b* does not receive a contention resolution message (e.g., if there is a conflict with another UE 115), UE 115-*b* may repeat the RACH procedure by transmitting a new RACH preamble (e.g., on a different BWP). Such exchange of messages between UE 115-*b* and base station 105-*b* for random access may be referred to as a four-step random access procedure or a four-step RACH procedure.

In other examples, a two-step random access procedure or a two-step RACH procedure may be performed for random access. For instance, wireless devices operating in licensed or unlicensed spectrum within wireless communications system 300 may initiate a two-step RACH procedure to reduce delay in establishing communication with base station 105-*b* (e.g., as compared to a four-step RACH procedure). In some cases, the two-step RACH procedure may operate regardless of whether a wireless device (e.g., UE 115-*b*) has a valid timing advance (TA). For example, UE 115-*b* may use a valid TA to coordinate the timing of its transmissions to base station 105-*b* (e.g., to account for propagation delay) and may receive the valid TA as part of the two-step RACH procedure. Additionally, the two-step RACH procedure may be applicable to any cell size, may work regardless of whether the RACH procedure is contention-based or contention-free, and may combine multiple RACH messages from a four-step RACH procedure. For example, the two-step RACH procedure may include a first message (e.g., a message A (MsgA)) that combines the Msg1 and Msg3 of the four-step RACH procedure and a second message (e.g., a message B (MsgB), a success RAR, etc.) that combines the Msg2 and Msg4 of the four-step RACH procedure.

However, in some cases, if a RACH failure occurs due to a maximum number of Msg1 or MsgA attempts (e.g., a threshold number of attempts for transmitting the first message) when UE 115-*b* attempts to perform a BWP switch 320, UE 115-*b* may declare RLF, or UE 115-*b* may switch to another BWP. Additionally or alternatively, if a consistent uplink LBT failure is identified before a RACH failure, UE 115-*b* may switch to another BWP and abort the RACH procedure.

Additionally or alternatively, UE 115-*b* may transmit an LBT failure indication 330 to base station 105-*b* to indicate a consistent LBT uplink failure on a BWP. For example, when the consistent uplink LBT failure occurs on a PSCell, the LBT failure indication 330 may include a dedicated cause value for this event (e.g., the consistent uplink LBT failure) in an SCG failure message (e.g., rather than an indication of a RACH failure). In some cases, the dedicated cause value may include number of switched BWPs that UE 115-*b* used. Additionally or alternatively, when the consistent uplink LBT failure occurs on a BWP within an SCell, the LBT failure indication 330 may include a MAC CE for this indication on a PCell or another SCell. In some cases, if multiple active BWPs are within the SCell where the consistent uplink LBT failure occurs, the LBT failure indication 330 may include an indication on a different BWP in this SCell in a different sub-band. Additionally or alternatively, when the consistent uplink LBT failure occurs on a PCell (e.g., after all the BWP switching and attempts on these) for a dual connectivity configuration (e.g., or carrier aggregation configuration), UE 115-*b* may perform a MCG recovery through a SN (e.g., secondary base station 105), and the LBT failure indication 330 may include an indication of the consistent uplink LBT failure that UE 115-*b* transmits to the SN which then forwards the LBT failure indication 330 to base station 105-*b* (e.g., MN).

Figure 4:
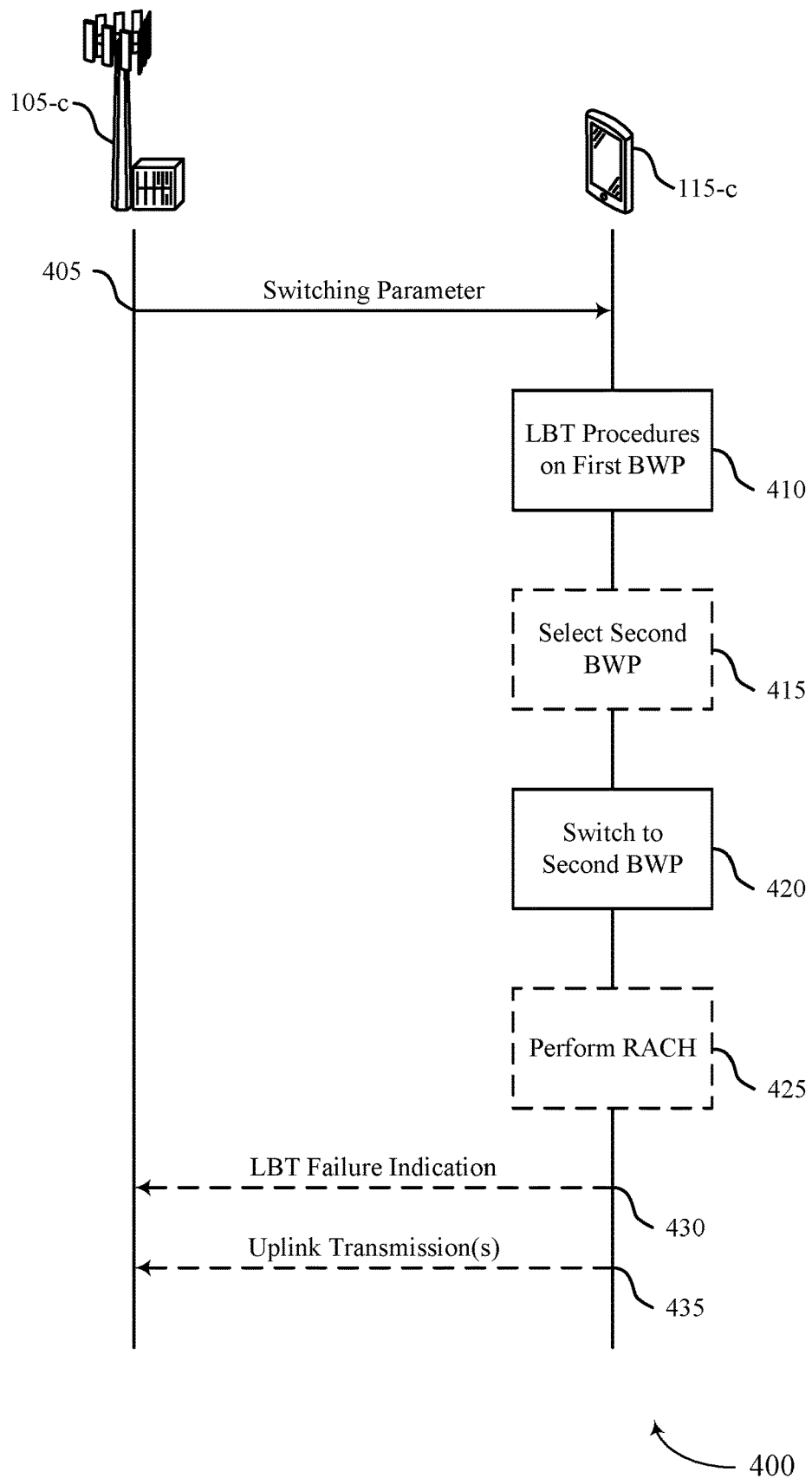
FIG. 4 illustrates an example of a process flow that supports uplink LBT failure recovery in accordance with aspects of the present disclosure.

FIG. 4 illustrates an example of a process flow 400 that supports uplink LBT failure recovery in accordance with aspects of the present disclosure. In some examples, process flow 400 may implement aspects of wireless communications systems 100, BWP switching configuration 200, and wireless communications systems 300. For example, process flow 400 may include a base station 105-*c* and a UE 115-*c*, which may be examples of corresponding base stations 105 and UEs 115, respectively, as described with reference to FIGS. 1-3.

In the following description of the process flow 400, the operations between UE 115-*c* and base station 105-*c* may be performed in different orders or at different times. Certain operations may also be left out of the process flow 400, or other operations may be added to the process flow 400. It is to be understood that while UE 115-*c* and base station 105-*c* are shown performing a number of the operations of the process flow 400, any wireless device may perform the operations shown.

At 405, UE 115-*c* may receive, from base station 105-*c*, a BWP switching configuration message including a switching parameter. In some cases, the switching parameter may include a number of BWP switches, an indication of which BWP can be switched to after a failure of another BWP, a priority order for a plurality of BWPs in the BWP switching configuration message, an indication for switching to a BWP in a different subband, an indication that a same BWP can be used multiple times for switching, a threshold time between switching to the same BWP, or a combination thereof. Additionally or alternatively, the switching parameter may include an indication of one or more of an upper threshold number of BWP switches, a lower threshold number of BWP switches, a fixed number of BWP switches, or a combination thereof.

At 410, UE 115-*c* may perform a set of LBT procedures for a first BWP.

At 415, UE 115-*c* may select a second BWP based on the switching parameter. In some cases, the switching parameter may include an indication of a BWP priority order, where selecting the second BWP is based on the BWP priority order. Additionally or alternatively, the switching parameter may include an indication of a subband constraint for the second BWP, where selecting the second BWP is based on the subband constraint. In some cases, the second BWP may be wholly in a second subband different than a first subband of the first BWP, a subset of the second BWP may be in the second subband different than the first subband of the first BWP, or a combination thereof.

In some cases, UE 115-c may determine a number of BWP switches based on the switching parameter, where the switch to the second BWP is based on the number of BWP switches. Additionally or alternatively, the switching parameter may include an indication that switching to a same BWP multiple times is permissible (e.g., an indication that a same BWP can be used multiple times for switching), where selecting the second BWP is based on the indication. In some cases, UE 115-c may determine a time threshold for switching to the same BWP, where selecting the second BWP is based on a time between successive switches to the second BWP satisfying the time threshold.

At 420, UE 115-c may switch to the second BWP for uplink communications with base station 105-c based on the switching parameter and a number of failures associated with the set of LBT procedures for the first BWP. In some cases, UE 115-c may determine to switch to the second BWP based on the number of failures associated with the set of LBT procedures for the first BWP satisfying a threshold value.

Additionally, in some cases, UE 115-c may perform one or more LBT procedures for the second BWP and may switch to a third BWP according to the BWP switching configuration and the switching parameter based on a number of failures associated with the one or more LBT procedures for the second BWP (e.g., satisfying the threshold value).

At 425, UE 115-c may perform a random access procedure (e.g., RACH procedure) on the second BWP based on switching to the second BWP. For example, UE 115-c may transmit a first message (e.g., Msg1, MsgA, etc.) of the random access procedure. In some cases, UE 115-c may determine a threshold number of attempts for transmitting the first message has been satisfied and may declare an RLF or may switch to a third BWP or a combination thereof based on the threshold number of attempts for transmitting the first message has been satisfied. Additionally or alternatively, UE 115-c may determine a number of uplink LBT failures for the second BWP exceeds the threshold value, may switch to a third BWP based on the number of uplink LBT failures for the second BWP exceeding the threshold value, and may abort the random access procedure on the second BWP.

At 430, UE 115-c may determine that the number of uplink LBT failures for the first BWP occur on a PSCell and may transmit a dedicated cause value for the number of uplink LBT failures for the first BWP in an SCG failure message. In some cases, the dedicated cause value may include a number of switched BWPs attempted. Additionally or alternatively, UE 115-c may determine that the number of uplink LBT failures for the first BWP occur on an SCell and may transmit a MAC CE indicating the uplink LBT failures on a PCell or an additional SCell. In some cases, UE 115-c may determine the SCell includes a set of BWPs that includes the first BWP and may transmit the MAC CE on an additional BWP in a different subband for the SCell than the first BWP.

Additionally or alternatively, UE 115-c may perform an MCG recovery procedure via an SN based on a determination that a number of uplink LBT failures for the second BWP satisfies the threshold value and that the number of uplink LBT failures for the second BWP occurs on a PCell. In some cases, UE 115-c may transmit an indication of a failure for the PCell based on the number of uplink LBT failures for the second BWP exceeding the threshold value to the SN.

At 435, base station 105-c may receive, from UE 115-c, a first uplink transmission in the first BWP. Additionally or alternatively, base station 105-c may receive, from UE 115-c, an uplink transmission in the second BWP based on the switching parameter and an uplink LBT failure.

Figure 5:
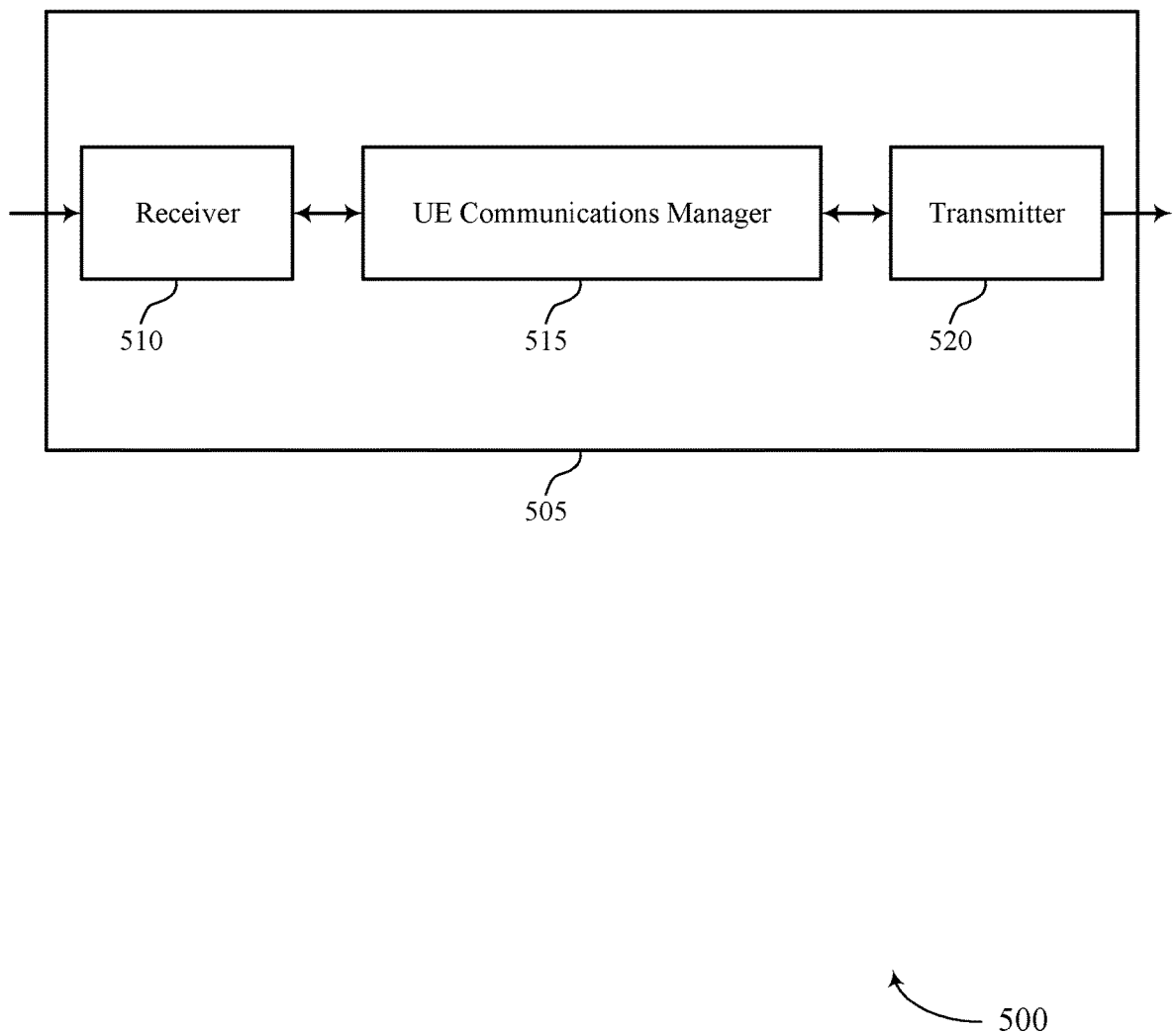
FIGS. 5 and 6 show block diagrams of devices that support uplink LBT failure recovery in accordance with aspects of the present disclosure.

FIG. 5 shows a block diagram 500 of a device 505 that supports uplink LBT failure recovery in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink LBT failure recovery, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive, from a base station, a BWP switching configuration message including a switching parameter. Additionally, the UE communications manager 515 may perform a set of LBT procedures for a first BWP. In some cases, the UE communications manager 515 may switch to a second BWP for uplink communications with the base station based on the switching parameter and a number of failures associated with the set of LBT procedures for the first BWP. The UE communications manager 515 may be an example of aspects of the UE communications manager 810 described herein.

Based on the actions performed by the UE communications manager 515, a UE 115 may efficiently identify a BWP to switch to when a first BWP has a consistent uplink BWP failure occur. Accordingly, the UE 115 may save power by not having to attempt to use BWPs that are not ideal for switching. Additionally, the UE 115 may reduce latency associated with trying and failing with other BWPs that are not ideal for switching.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
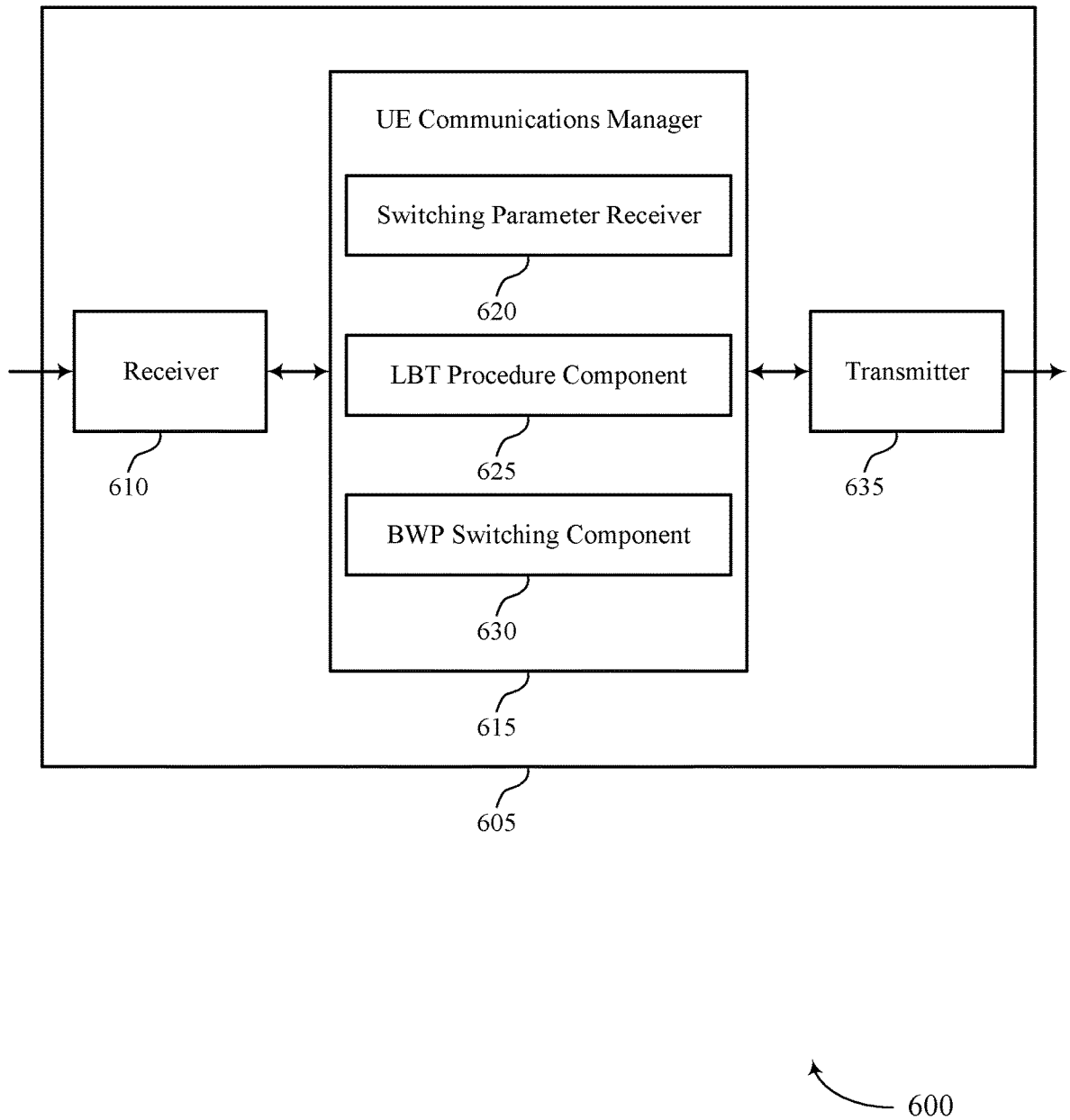

FIG. 6 shows a block diagram 600 of a device 605 that supports uplink LBT failure recovery in accordance with aspects of the present disclosure. The device 605 may be an example of aspects of a device 505, or a UE 115 as described herein. The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to uplink LBT failure recovery, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a switching parameter receiver 620, an LBT procedure component 625, and a BWP switching component 630. The UE communications manager 615 may be an example of aspects of the UE communications manager 810 described herein.

The switching parameter receiver 620 may receive, from a base station, a BWP switching configuration message including a switching parameter.

The LBT procedure component 625 may perform a set of LBT procedures for a first BWP.

The BWP switching component 630 may switch to a second BWP for uplink communications with the base station based on the switching parameter and a number of failures associated with the set of LBT procedures for the first BWP.

Based on receiving the switching parameter, a processor of a UE 115 (e.g., controlling the receiver 610, the transmitter 635, or a transceiver 820 as described with reference to FIG. 8) may identify a BWP that has a higher chance of being successful for switching to after identifying a consistent uplink LBT failure at a first BWP. Accordingly, the processor may have reduced computational complexity in that information included in the switching parameter is used for identifying and selecting the BWP to switch to rather than having to determine a BWP to switch to on its own.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
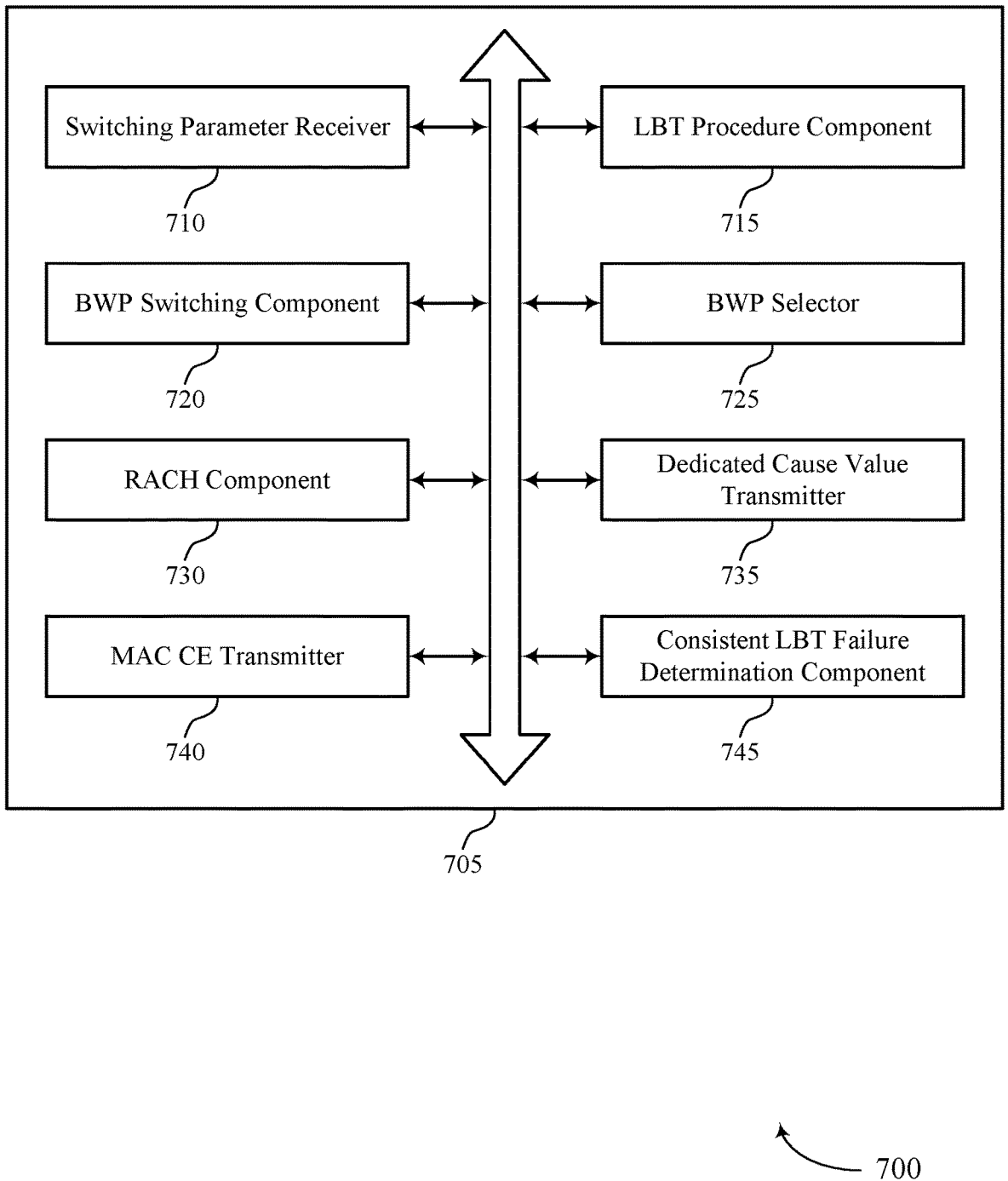
FIG. 7 shows a block diagram of a user equipment (UE) communications manager that supports uplink LBT failure recovery in accordance with aspects of the present disclosure.

FIG. 7 shows a block diagram 700 of a UE communications manager 705 that supports uplink LBT failure recovery in accordance with aspects of the present disclosure. The UE communications manager 705 may be an example of aspects of a UE communications manager 515, a UE communications manager 615, or a UE communications manager 810 described herein. The UE communications manager 705 may include a switching parameter receiver 710, an LBT procedure component 715, a BWP switching component 720, a BWP selector 725, a RACH component 730, a dedicated cause value transmitter 735, a MAC CE transmitter 740, and a consistent LBT failure determination component 745. Each of these modules may communicate, directly or indirectly, with one another (e.g., via one or more buses).

The switching parameter receiver 710 may receive, from a base station, a BWP switching configuration message including a switching parameter. In some examples, the switching parameter receiver 710 may determine a number of BWP switches based on the switching parameter, where the switch to a second BWP is based on the number of BWP switches. In some cases, the number of BWP switches may include an upper threshold number of BWP switches, a lower threshold number of BWP switches, a fixed number of BWP switches, or a combination thereof.

The LBT procedure component 715 may perform a set of LBT procedures for a first BWP.

The BWP switching component 720 may switch to a second BWP for uplink communications with the base station based on the switching parameter and a number of failures associated with the set of LBT procedures for the first BWP. In some examples, the BWP switching component 720 may perform one or more LBT procedures for the second BWP and may switch to a third BWP according to the BWP switching configuration and the switching parameter based on a number of failures associated with the one or more LBT procedures for the second BWP.

The BWP selector 725 may select the second BWP based on the switching parameter. In some cases, the switching parameter may include an indication of a BWP priority order, where selecting the second BWP is based on the BWP priority order. Additionally or alternatively, the switching parameter may include an indication of a subband constraint for the second BWP, where selecting the second BWP is based on the subband constraint. In some cases, the second BWP may be wholly in a second subband different than a first subband of the first BWP, a subset of the second BWP may be in the second subband different than the first subband of the first BWP, or a combination thereof. Additionally or alternatively, the switching parameter may include an indication that switching to a same BWP multiple times is permissible, where selecting the second BWP is based on the indication. Accordingly, the BWP selector 725 may determine a time threshold for switching to the same BWP, where selecting the second BWP is based on a time between successive switches to the second BWP satisfying the time threshold.

The RACH component 730 may perform a random access procedure on the second BWP based on switching to the second BWP. In some examples, the RACH component 730 may transmit a first message of the random access procedure, may determine a threshold number of attempts for transmitting the first message has been satisfied, and may declare an RLF or may switch to a third BWP or a combination thereof, based on the threshold number of attempts for transmitting the first message has been satisfied. Additionally or alternatively, the RACH component 730 may determine a number of uplink LBT failures for the second BWP exceeds a threshold value, may switch to a third BWP based on the number of uplink LBT failures for the second BWP exceeding the threshold value, and may abort the random access procedure on the second BWP.

The dedicated cause value transmitter 735 may determine that the number of uplink LBT failures for the first BWP occur on a PSCell. Accordingly, the dedicated cause value transmitter 735 may transmit a dedicated cause value for the number of uplink LBT failures for the first BWP in an SCG failure message. In some cases, the dedicated cause value may include a number of switched BWPs attempted.

The MAC CE transmitter 740 may determine that the number of uplink LBT failures for the first BWP occur on an SCell and may transmit a MAC CE indicating the uplink LBT failures on a PCell or an additional SCell. In some examples, the MAC CE transmitter 740 may determine the SCell includes a set of BWPs that includes the first BWP and may transmit the MAC CE on an additional BWP in a different subband for the SCell than the first BWP.

The consistent LBT failure determination component 745 may determine to switch to the second BWP based on the number of failures associated with the set of LBT procedures for the first BWP satisfying a threshold value. In some examples, the consistent LBT failure determination component 745 may perform an MCG recovery procedure via an SN based on a determination that a number of uplink LBT failures for the second BWP satisfies the threshold value and that the number of uplink LBT failures for the second BWP occurs on a PCell. Additionally, the consistent LBT failure determination component 745 may transmit an indication of a failure for the PCell based on the number of uplink LBT failures for the second BWP exceeding the threshold value to the SN.

Figure 8:
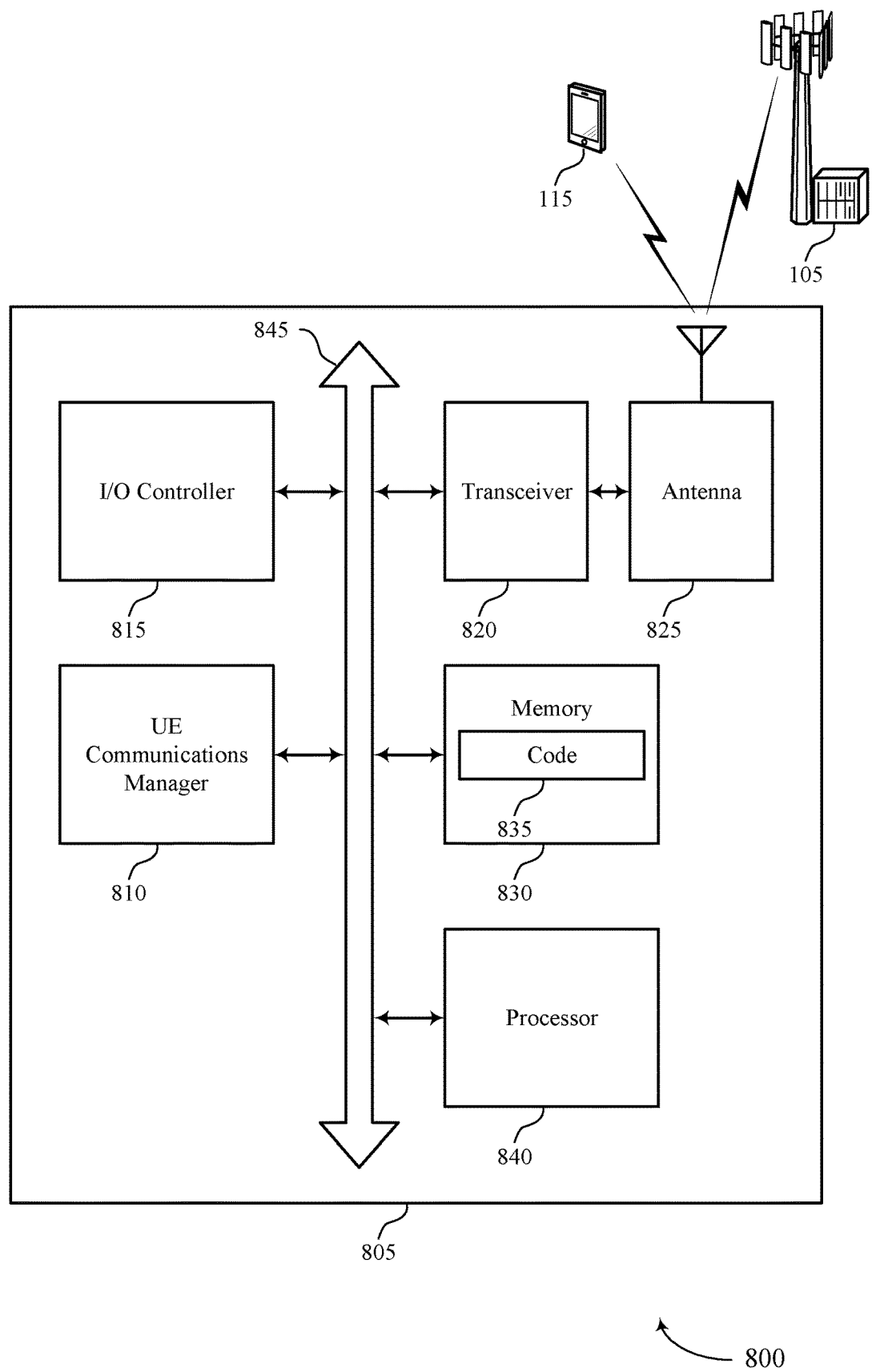
FIG. 8 shows a diagram of a system including a device that supports uplink LBT failure recovery in accordance with aspects of the present disclosure.

FIG. 8 shows a diagram of a system 800 including a device 805 that supports uplink LBT failure recovery in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive, from a base station, a BWP switching configuration message including a switching parameter. Additionally, the UE communications manager 810 may perform a set of LBT procedures for a first BWP. In some cases, the UE communications manager 810 may switch to a second BWP for uplink communications with the base station based on the switching parameter and a number of failures associated with the set of LBT procedures for the first BWP.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink LBT failure recovery).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
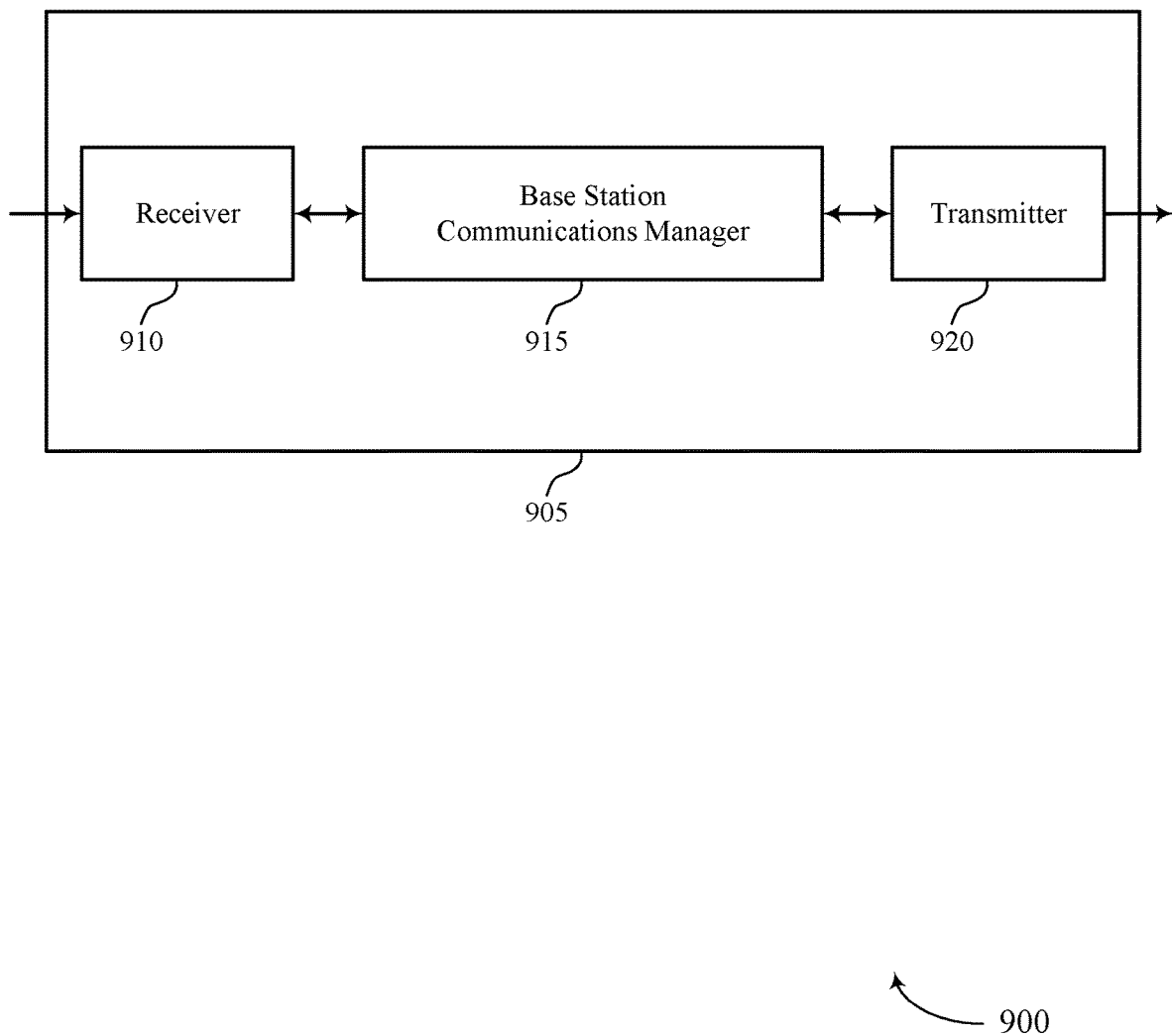
FIGS. 9 and 10 show block diagrams of devices that support uplink LBT failure recovery in accordance with aspects of the present disclosure.

FIG. 9 shows a block diagram 900 of a device 905 that supports uplink LBT failure recovery in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink LBT failure recovery, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit, to a UE, a BWP switching configuration message including a switching parameter. In some cases, the base station communications manager 915 may receive, from the UE, a first uplink transmission in a first BWP. Additionally, the base station communications manager 915 may receive, from the UE, an uplink transmission in a second BWP based on the switching parameter and an uplink LBT failure. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
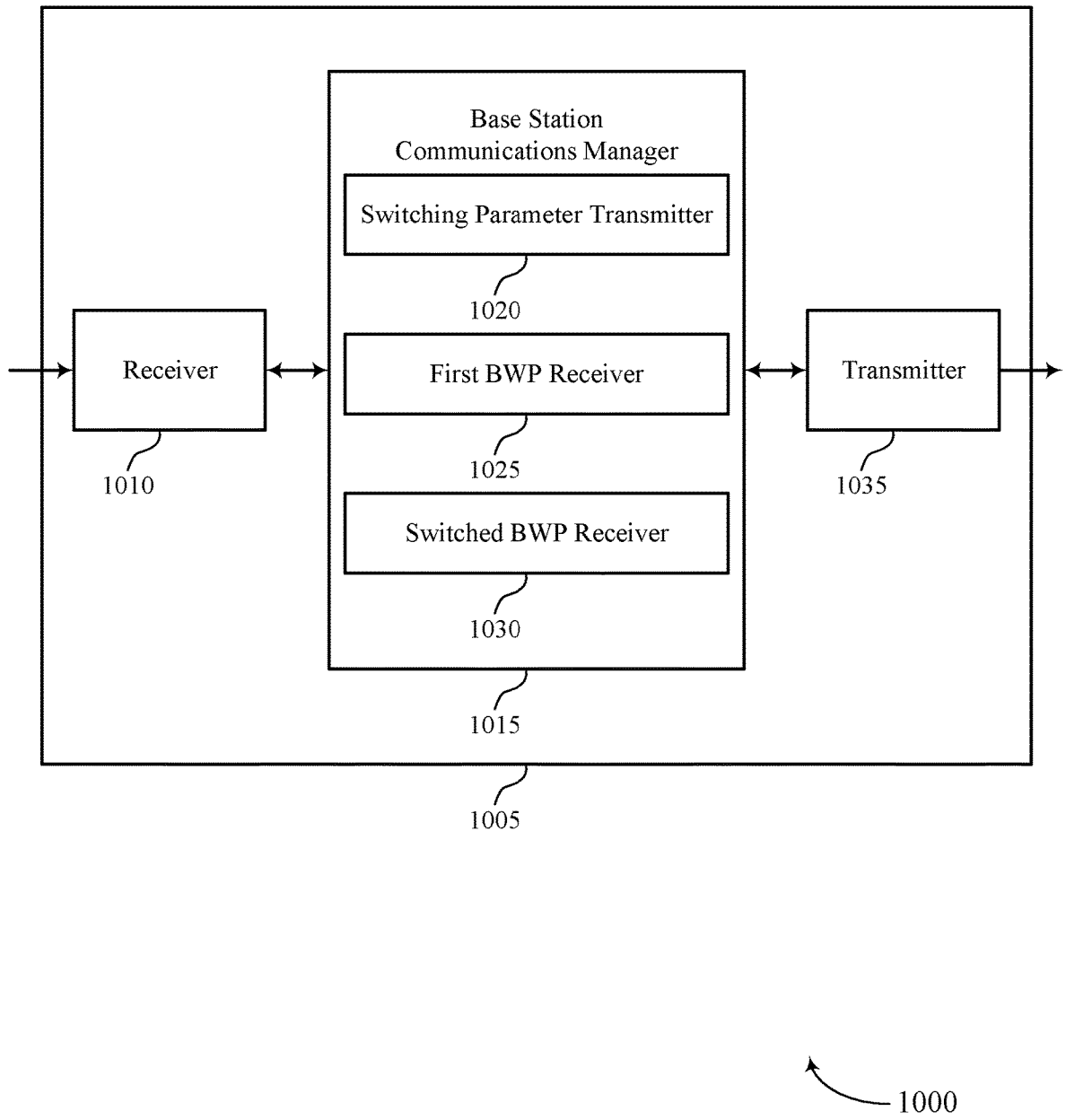

FIG. 10 shows a block diagram 1000 of a device 1005 that supports uplink LBT failure recovery in accordance with aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink LBT failure recovery, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a switching parameter transmitter 1020, a first BWP receiver 1025, and a switched BWP receiver 1030. The base station communications manager 1015 may be an example of aspects of the base station communications manager 1210 described herein.

The switching parameter transmitter 1020 may transmit, to a UE, a BWP switching configuration message including a switching parameter.

The first BWP receiver 1025 may receive, from the UE, a first uplink transmission in a first BWP.

The switched BWP receiver 1030 may receive, from the UE, an uplink transmission in a second BWP based on the switching parameter and an uplink LBT failure.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
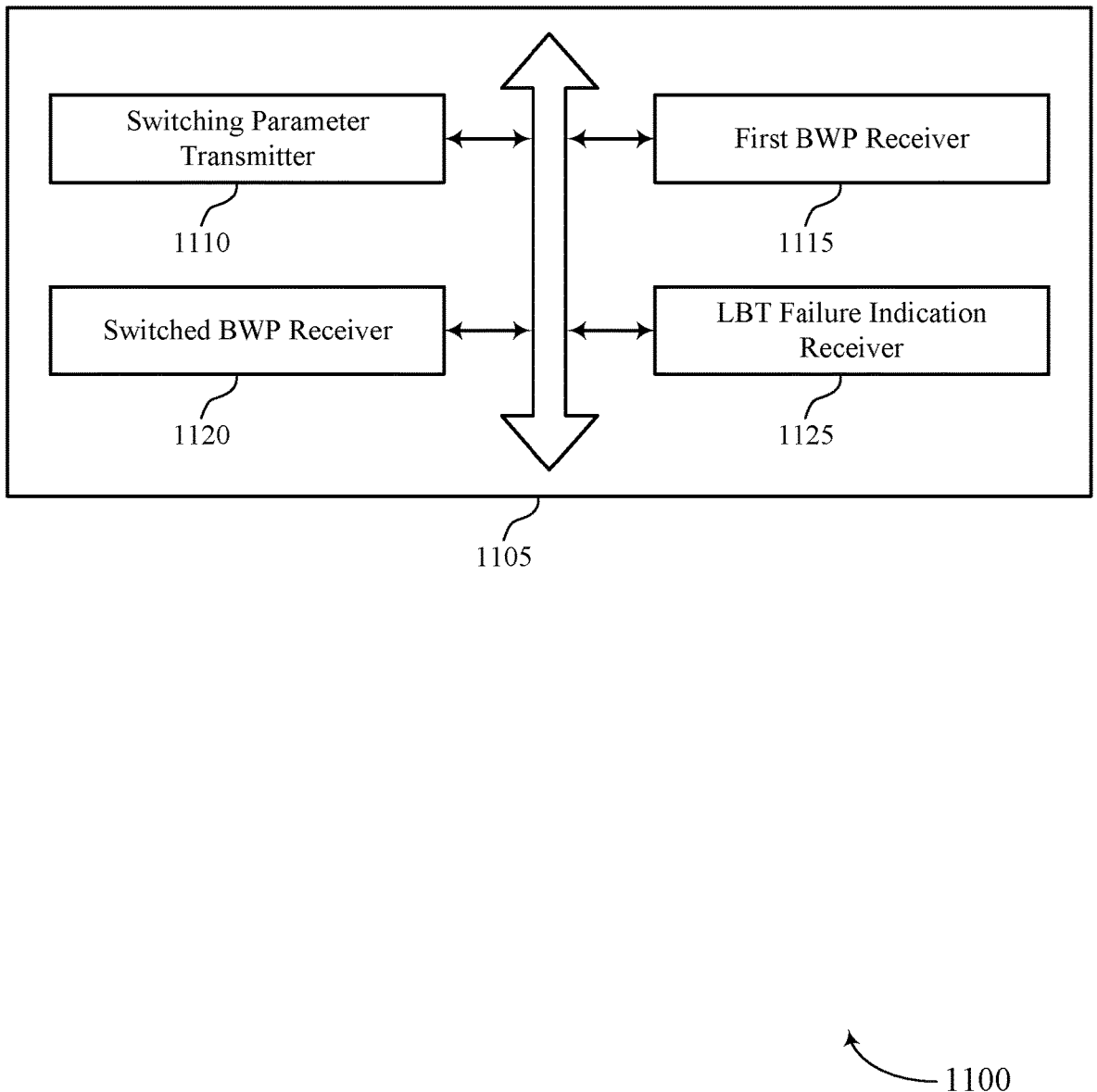
FIG. 11 shows a block diagram of a base station communications manager that supports uplink LBT failure recovery in accordance with aspects of the present disclosure.

FIG. 11 shows a block diagram 1100 of a base station communications manager 1105 that supports uplink LBT failure recovery in accordance with aspects of the present disclosure. The base station communications manager 1105 may be an example of aspects of a base station communications manager 915, a base station communications manager 1015, or a base station communications manager 1210 described herein. The base station communications manager 1105 may include a switching parameter transmitter 1110, a first BWP receiver 1115, a switched BWP receiver 1120, and a LBT failure indication receiver 1125. Each of these modules may communicate, directly or indirectly, with one another (e.g., via one or more buses).

The switching parameter transmitter 1110 may transmit, to a UE, a BWP switching configuration message including a switching parameter. In some cases, the switching parameter may include a number of BWP switches, an indication of which BWP can be switched to after a failure of another BWP, a priority order for a set of BWPs in the BWP switching configuration message, an indication for switching to a BWP in a different subband, an indication that a same BWP can be used multiple times for switching, a threshold time between switching to the same BWP, or a combination thereof.

The first BWP receiver 1115 may receive, from the UE, a first uplink transmission in a first BWP.

The switched BWP receiver 1120 may receive, from the UE, an uplink transmission in a second BWP based on the switching parameter and an uplink LBT failure.

The LBT failure indication receiver 1125 may receive, from the UE, a dedicated cause value for a number of uplink LBT failures for the first BWP in an SCG failure message, where the dedicated cause value includes a number of switched BWPs attempted. Additionally or alternatively, the LBT failure indication receiver 1125 may receive, from the UE, a MAC CE indicating a number of uplink LBT failures for the first BWP on a PCell or an SCell. Additionally or alternatively, the LBT failure indication receiver 1125 may receive, from an SN, an indication of a failure for a PCell based on a number of uplink LBT failures for the first BWP exceeding a threshold value. In some cases, the MAC CE may be received on an additional BWP in a different subband for the secondary cell than the first BWP.

Figure 12:
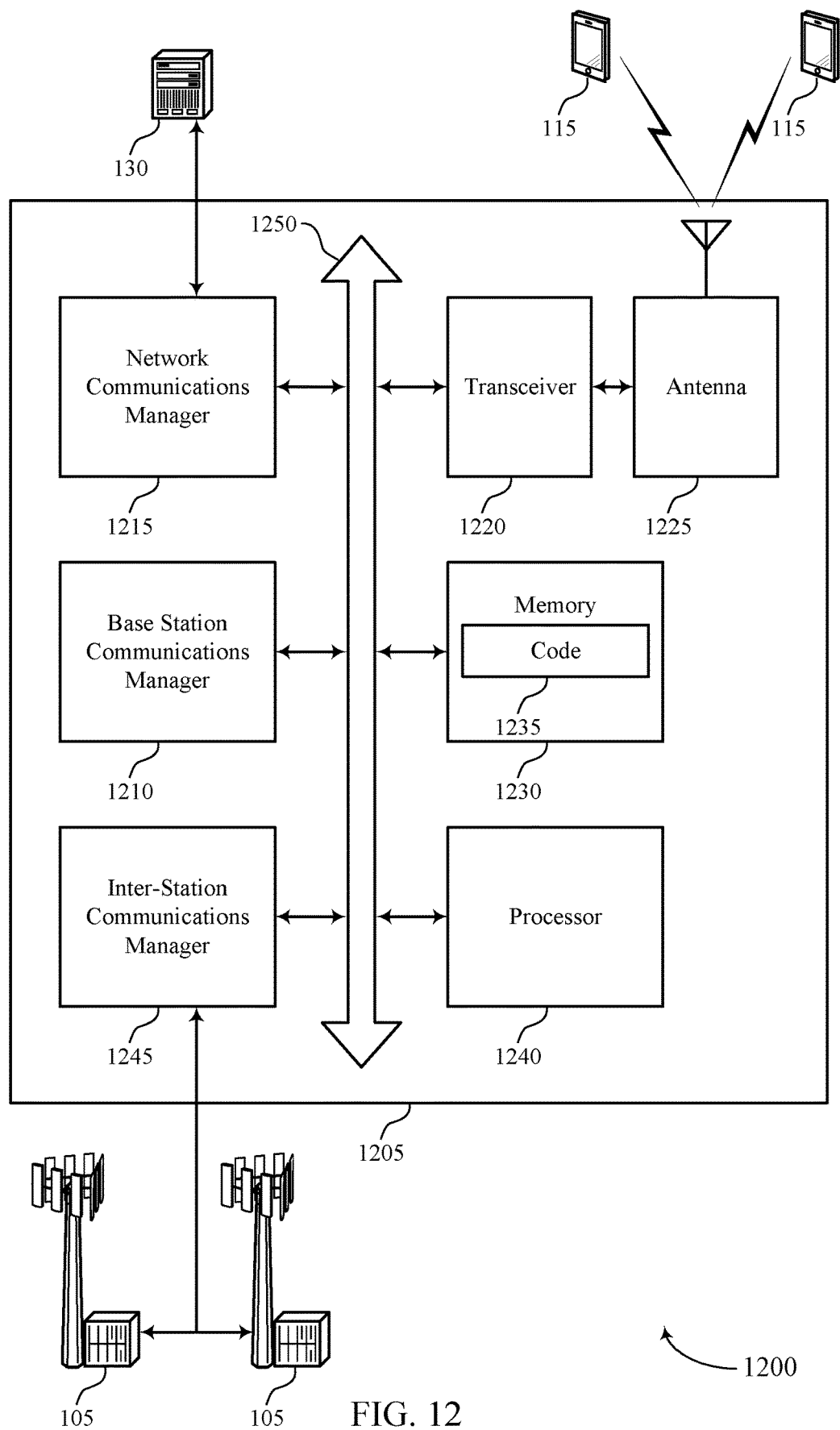
FIG. 12 shows a diagram of a system including a device that supports uplink LBT failure recovery in accordance with aspects of the present disclosure.

FIG. 12 shows a diagram of a system 1200 including a device 1205 that supports uplink LBT failure recovery in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit, to a UE, a BWP switching configuration message including a switching parameter. In some cases, the base station communications manager 1210 may receive, from the UE, a first uplink transmission in a first BWP. Additionally, the base station communications manager 1210 may receive, from the UE, an uplink transmission in a second BWP based on the switching parameter and an uplink LBT failure.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting uplink LBT failure recovery).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
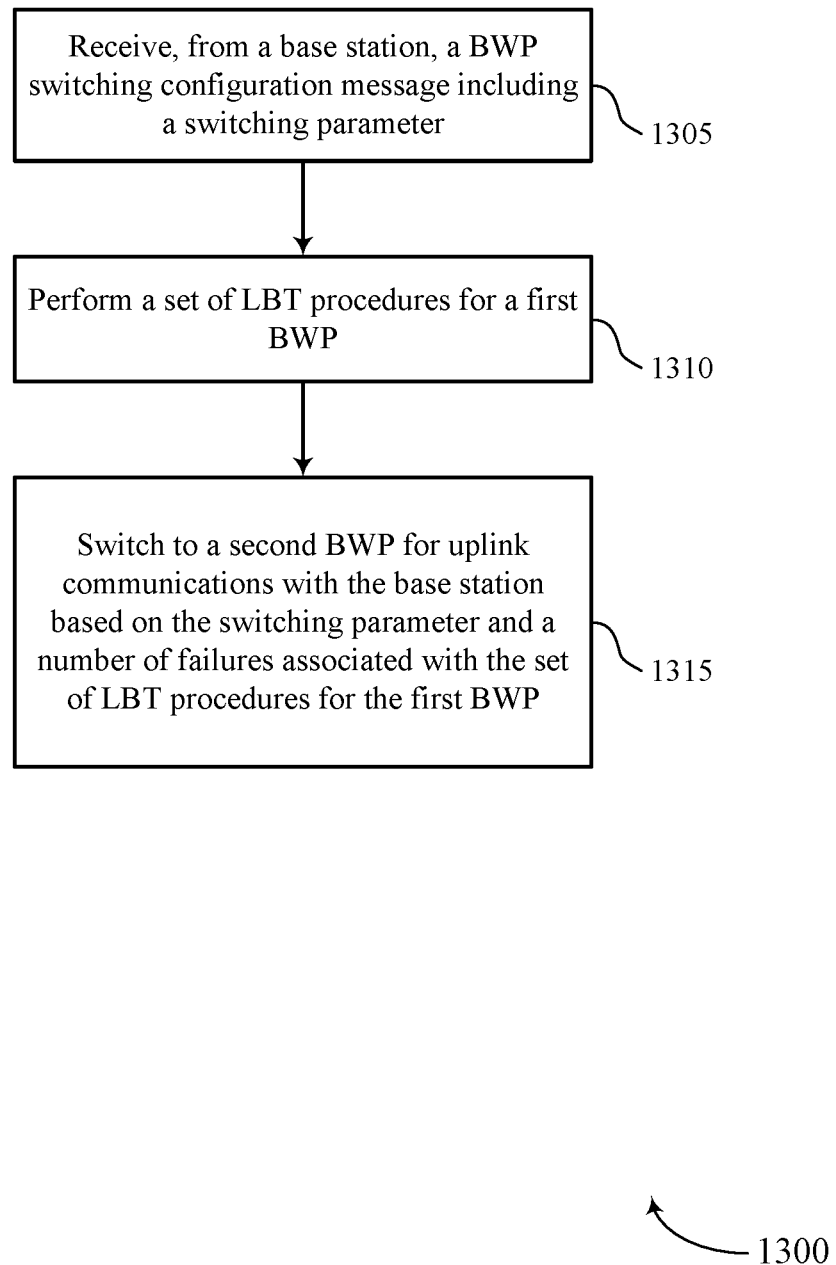
FIGS. 13 through 18 show flowcharts illustrating methods that support uplink LBT failure recovery in accordance with aspects of the present disclosure.

FIG. 13 shows a flowchart illustrating a method 1300 that supports uplink LBT failure recovery in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described. Additionally or alternatively, a UE may perform aspects of the functions described using special-purpose hardware.

At 1305, the UE may receive, from a base station, a BWP switching configuration message including a switching parameter. The operations of 1305 may be performed according to the methods described herein. In some examples, aspects of the operations of 1305 may be performed by a switching parameter receiver as described with reference to FIGS. 5 through 8.

At 1310, the UE may perform a set of LBT procedures for a first BWP. The operations of 1310 may be performed according to the methods described herein. In some examples, aspects of the operations of 1310 may be performed by an LBT procedure component as described with reference to FIGS. 5 through 8.

At 1315, the UE may switch to a second BWP for uplink communications with the base station based on the switching parameter and a number of failures associated with the set of LBT procedures for the first BWP. The operations of 1315 may be performed according to the methods described herein. In some examples, aspects of the operations of 1315 may be performed by a BWP switching component as described with reference to FIGS. 5 through 8.

Figure 14:
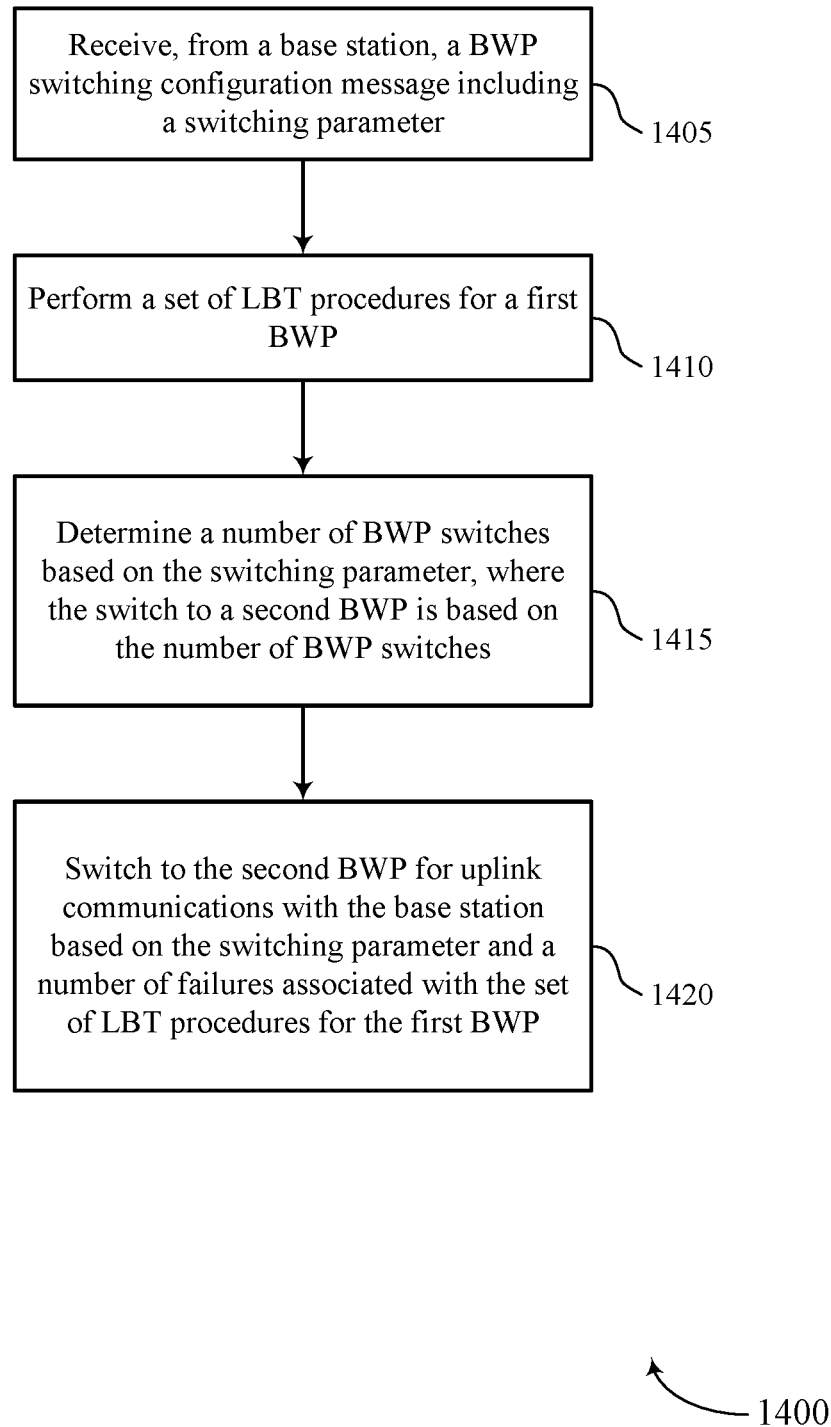

FIG. 14 shows a flowchart illustrating a method 1400 that supports uplink LBT failure recovery in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described. Additionally or alternatively, a UE may perform aspects of the functions described using special-purpose hardware.

At 1405, the UE may receive, from a base station, a BWP switching configuration message including a switching parameter. The operations of 1405 may be performed according to the methods described herein. In some examples, aspects of the operations of 1405 may be performed by a switching parameter receiver as described with reference to FIGS. 5 through 8.

At 1410, the UE may perform a set of LBT procedures for a first BWP. The operations of 1410 may be performed according to the methods described herein. In some examples, aspects of the operations of 1410 may be performed by an LBT procedure component as described with reference to FIGS. 5 through 8.

At 1415, the UE may determine a number of BWP switches based on the switching parameter, where the switch to the second BWP is based on the number of BWP switches. The operations of 1415 may be performed according to the methods described herein. In some examples, aspects of the operations of 1415 may be performed by a switching parameter receiver as described with reference to FIGS. 5 through 8.

At 1420, the UE may switch to a second BWP for uplink communications with the base station based on the switching parameter and a number of failures associated with the set of LBT procedures for the first BWP. The operations of 1420 may be performed according to the methods described herein. In some examples, aspects of the operations of 1420 may be performed by a BWP switching component as described with reference to FIGS. 5 through 8.

Figure 15:
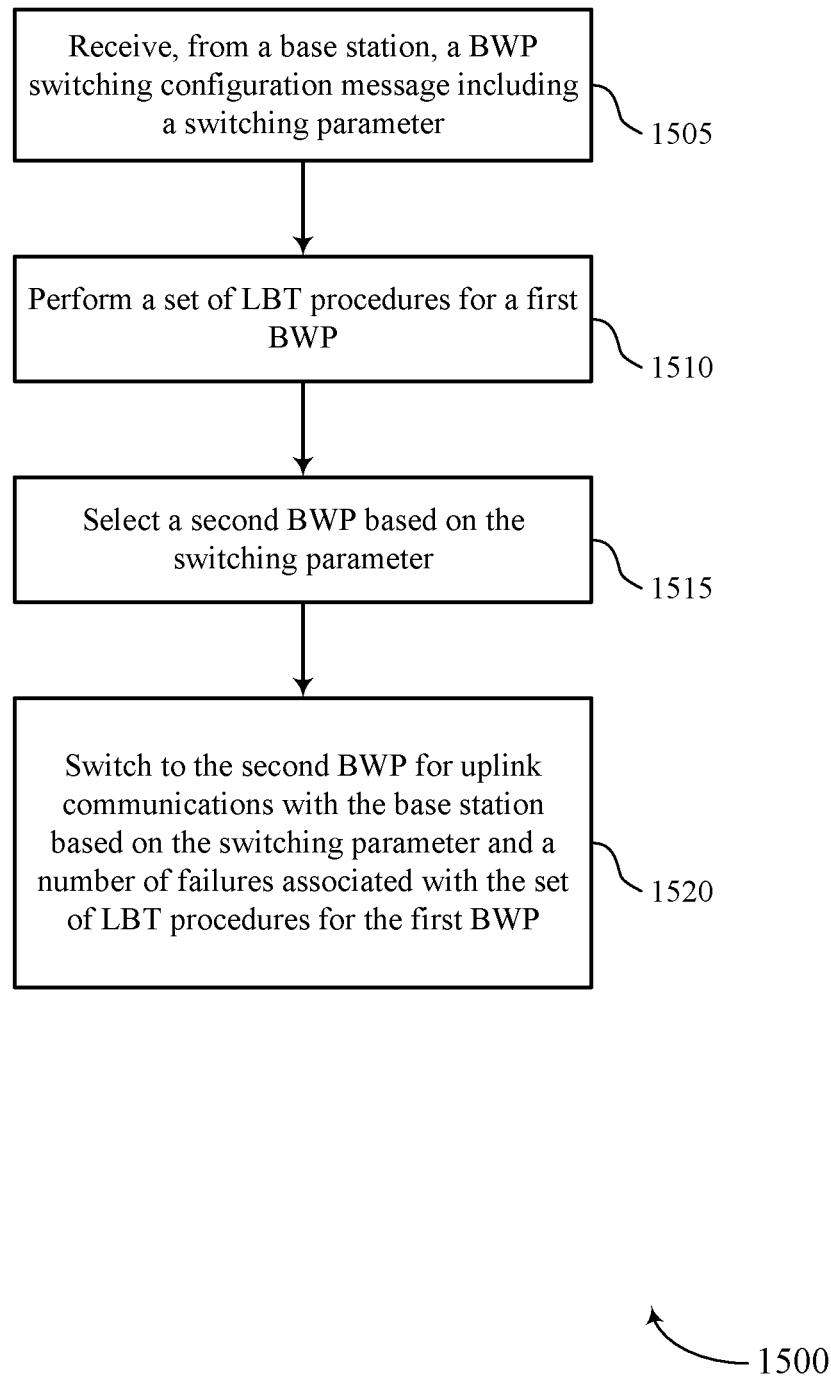

FIG. 15 shows a flowchart illustrating a method 1500 that supports uplink LBT failure recovery in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described. Additionally or alternatively, a UE may perform aspects of the functions described using special-purpose hardware.

At 1505, the UE may receive, from a base station, a BWP switching configuration message including a switching parameter. The operations of 1505 may be performed according to the methods described herein. In some examples, aspects of the operations of 1505 may be performed by a switching parameter receiver as described with reference to FIGS. 5 through 8.

At 1510, the UE may perform a set of LBT procedures for a first BWP. The operations of 1510 may be performed according to the methods described herein. In some examples, aspects of the operations of 1510 may be performed by an LBT procedure component as described with reference to FIGS. 5 through 8.

At 1515, the UE may select the second BWP based on the switching parameter. The operations of 1515 may be performed according to the methods described herein. In some examples, aspects of the operations of 1515 may be performed by a BWP selector as described with reference to FIGS. 5 through 8.

At 1520, the UE may switch to a second BWP for uplink communications with the base station based on the switching parameter and a number of failures associated with the set of LBT procedures for the first BWP. The operations of 1520 may be performed according to the methods described herein. In some examples, aspects of the operations of 1520 may be performed by a BWP switching component as described with reference to FIGS. 5 through 8.

Figure 16:
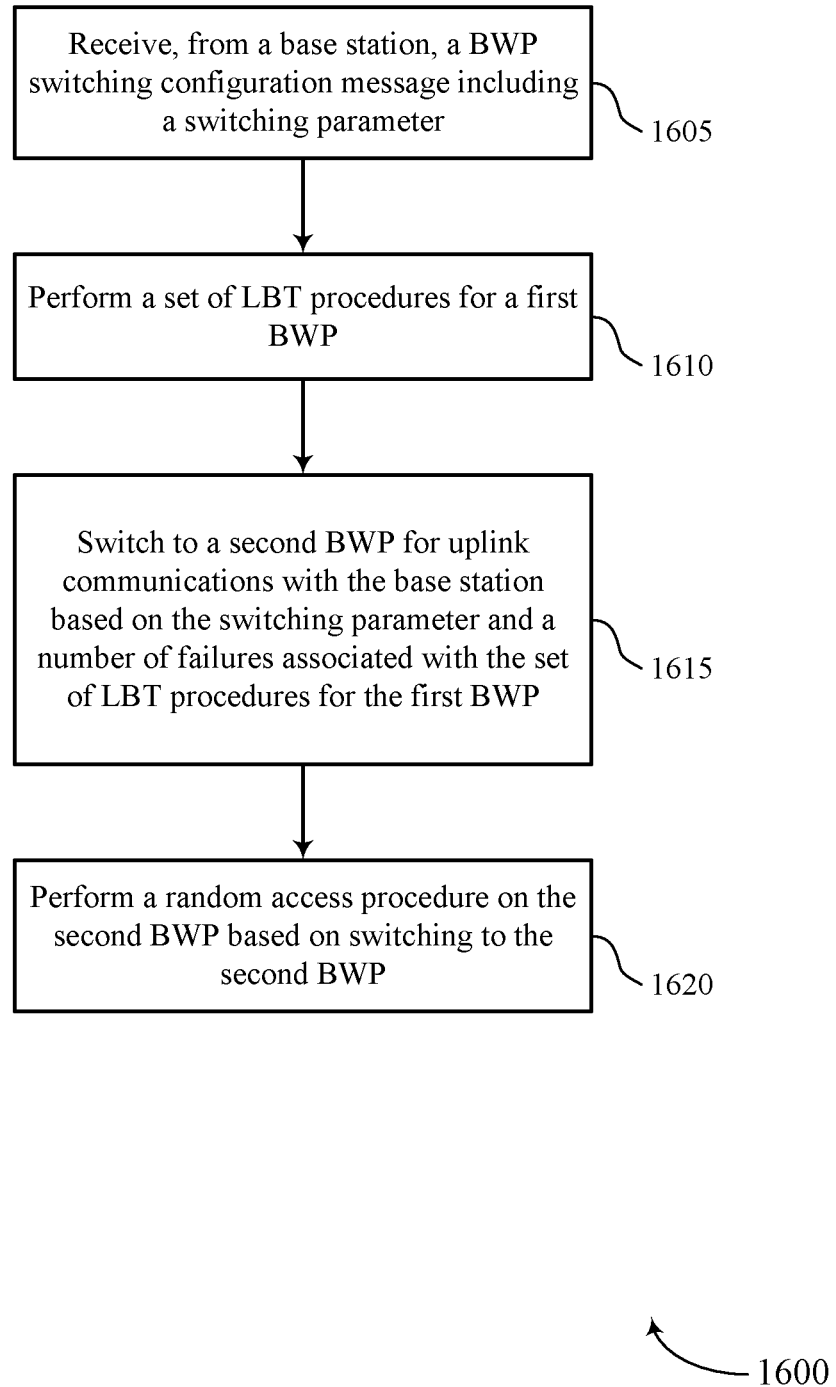

FIG. 16 shows a flowchart illustrating a method 1600 that supports uplink LBT failure recovery in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE may execute a set of instructions to control the functional elements of the UE to perform the functions described. Additionally or alternatively, a UE may perform aspects of the functions described using special-purpose hardware.

At 1605, the UE may receive, from a base station, a BWP switching configuration message including a switching parameter. The operations of 1605 may be performed according to the methods described herein. In some examples, aspects of the operations of 1605 may be performed by a switching parameter receiver as described with reference to FIGS. 5 through 8.

At 1610, the UE may perform a set of LBT procedures for a first BWP. The operations of 1610 may be performed according to the methods described herein. In some examples, aspects of the operations of 1610 may be performed by an LBT procedure component as described with reference to FIGS. 5 through 8.

At 1615, the UE may switch to a second BWP for uplink communications with the base station based on the switching parameter and a number of failures associated with the set of LBT procedures for the first BWP. The operations of 1615 may be performed according to the methods described herein. In some examples, aspects of the operations of 1615 may be performed by a BWP switching component as described with reference to FIGS. 5 through 8.

At 1620, the UE may perform a random access procedure on the second BWP based on switching to the second BWP. The operations of 1620 may be performed according to the methods described herein. In some examples, aspects of the operations of 1620 may be performed by a RACH component as described with reference to FIGS. 5 through 8.

Figure 17:
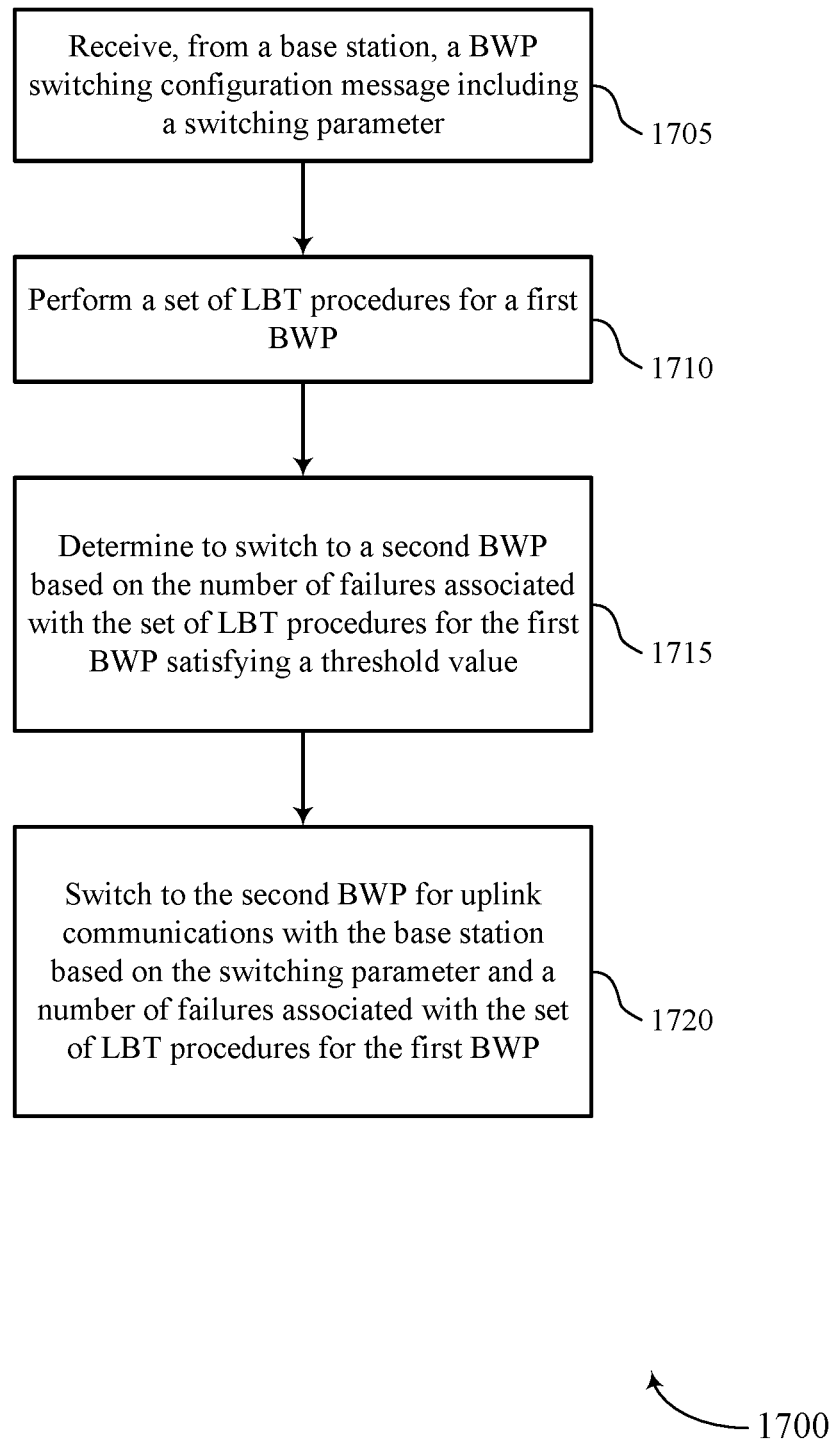

FIG. 17 shows a flowchart illustrating a method 1700 that supports uplink LBT failure recovery in accordance with aspects of the present disclosure. The operations of method 1700 may be implemented by a UE 115 or its components as described herein. For example, the operations of method 1700 may be performed by a UE communications manager as described with reference to FIGS. 5 through 8. In some examples, a UE may execute a set of instructions to control the functional elements of the UE to perform the functions described. Additionally or alternatively, a UE may perform aspects of the functions described using special-purpose hardware.

At 1705, the UE may receive, from a base station, a BWP switching configuration message including a switching parameter. The operations of 1705 may be performed according to the methods described herein. In some examples, aspects of the operations of 1705 may be performed by a switching parameter receiver as described with reference to FIGS. 5 through 8.

At 1710, the UE may perform a set of LBT procedures for a first BWP. The operations of 1710 may be performed according to the methods described herein. In some examples, aspects of the operations of 1710 may be performed by an LBT procedure component as described with reference to FIGS. 5 through 8.

At 1715, the UE may determine to switch to the second BWP based on the number of failures associated with the set of LBT procedures for the first BWP satisfying a threshold value. The operations of 1715 may be performed according to the methods described herein. In some examples, aspects of the operations of 1715 may be performed by a consistent LBT failure determination component as described with reference to FIGS. 5 through 8.

At 1720, the UE may switch to a second BWP for uplink communications with the base station based on the switching parameter and a number of failures associated with the set of LBT procedures for the first BWP. The operations of 1720 may be performed according to the methods described herein. In some examples, aspects of the operations of 1720 may be performed by a BWP switching component as described with reference to FIGS. 5 through 8.

Figure 18:
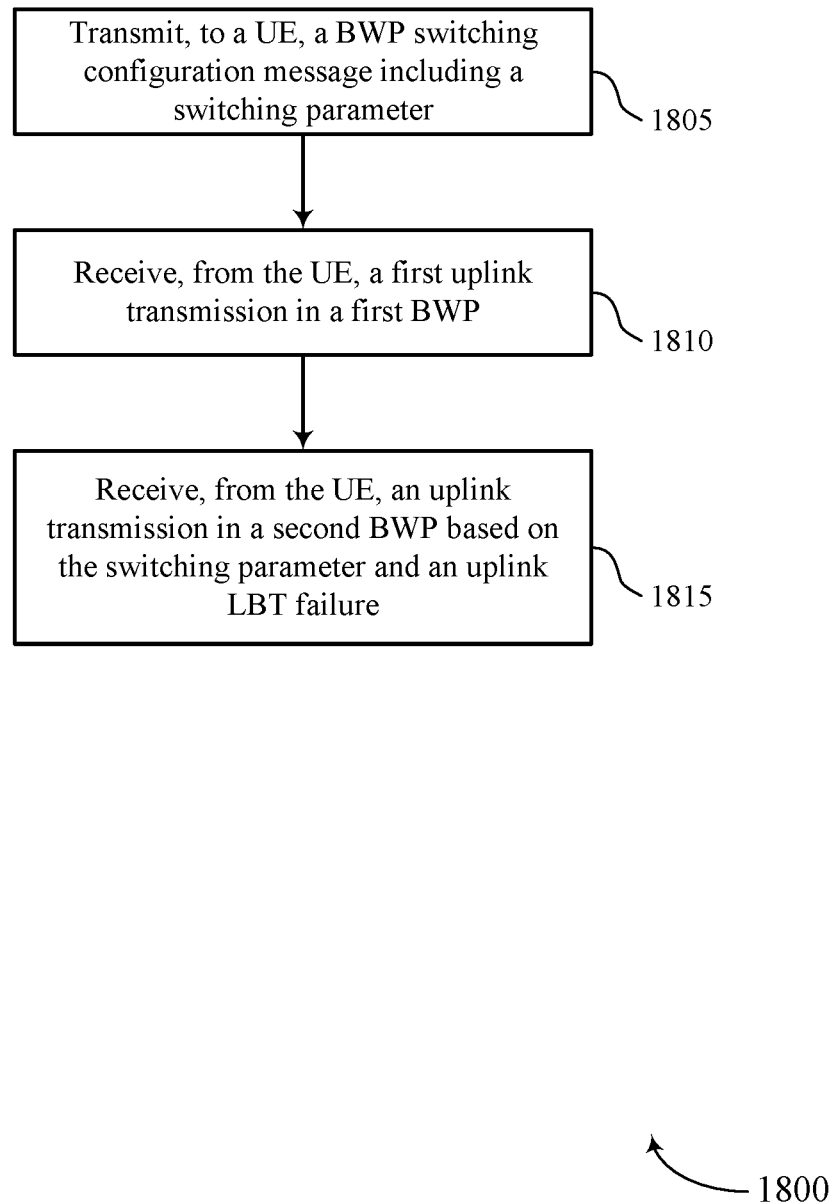

FIG. 18 shows a flowchart illustrating a method 1800 that supports uplink LBT failure recovery in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station may execute a set of instructions to control the functional elements of the base station to perform the functions described. Additionally or alternatively, a base station may perform aspects of the functions described using special-purpose hardware.

At 1805, the base station may transmit, to a UE, a BWP switching configuration message including a switching parameter. The operations of 1805 may be performed according to the methods described herein. In some examples, aspects of the operations of 1805 may be performed by a switching parameter transmitter as described with reference to FIGS. 9 through 12.

At 1810, the base station may receive, from the UE, a first uplink transmission in a first BWP. The operations of 1810 may be performed according to the methods described herein. In some examples, aspects of the operations of 1810 may be performed by a first BWP receiver as described with reference to FIGS. 9 through 12.

At 1815, the base station may receive, from the UE, an uplink transmission in a second BWP based on the switching parameter and an uplink LBT failure. The operations of 1815 may be performed according to the methods described herein. In some examples, aspects of the operations of 1815 may be performed by a switched BWP receiver as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, a bandwidth part switching configuration message comprising a switching parameter; performing a plurality of listen-before-talk procedures for a first bandwidth part; and switching to a second bandwidth part for uplink communications with the base station based at least in part on the switching parameter and a number of failures associated with the plurality of listen-before-talk procedures for the first bandwidth part.

Aspect 2: The method of aspect 1, further comprising: performing a random access procedure on the second bandwidth part based at least in part on switching to the second bandwidth part.

Aspect 3: The method of aspect 2, further comprising: transmitting a first message of the random access procedure; determining a threshold number of attempts for transmitting the first message has been satisfied; and declaring a radio link failure or switching to a third bandwidth part or a combination thereof based at least in part on the threshold number of attempts for transmitting the first message has been satisfied.

Aspect 4: The method of any of aspects 2 through 3, further comprising: determining a number of uplink listen-before-talk failures for the second bandwidth part exceeds a threshold value; switching to a third bandwidth part based at least in part on the number of uplink listen-before-talk failures for the second bandwidth part exceeding the threshold value; and aborting the random access procedure on the second bandwidth part.

Aspect 5: The method of any of aspects 1 through 4, further comprising: determining that a number of uplink listen-before-talk failures for the first bandwidth part occur on a primary secondary cell; and transmitting a dedicated cause value for the number of uplink listen-before-talk failures for the first bandwidth part in a secondary cell group failure message.

Aspect 6: The method of aspect 5, wherein the dedicated cause value comprises a number of switched bandwidth parts attempted.

Aspect 7: The method of any of aspects 1 through 6, further comprising: determining that a number of uplink listen-before-talk failures for the first bandwidth part occur on a secondary cell; and transmitting a medium access control (MAC) control element indicating the uplink listen-before-talk failures on a primary cell or an additional secondary cell.

Aspect 8: The method of aspect 7, wherein transmitting the MAC control element comprises: determining the secondary cell comprises a plurality of bandwidth parts that includes the first bandwidth part; and transmitting the MAC control element on an additional bandwidth part in a different subband for the secondary cell than the first bandwidth part.

Aspect 9: The method of any of aspects 1 through 8, further comprising: determining to switch to the second bandwidth part based at least in part on the number of failures associated with the plurality of listen-before-talk procedures for the first bandwidth part satisfying a threshold value.

Aspect 10: The method of aspect 9, further comprising: performing a master cell group recovery procedure via a secondary node based at least in part on a determination that a number of uplink listen-before-talk failures for the second bandwidth part satisfies the threshold value and that the number of uplink listen-before-talk failures for the second bandwidth part occurs on a primary cell.

Aspect 11: The method of aspect 10, wherein performing the master cell group recovery procedure via the secondary node comprises: transmitting an indication of a failure for the primary cell based at least in part on the number of uplink listen-before-talk failures for the second bandwidth part exceeding the threshold value to the secondary node.

Aspect 12: The method of any of aspects 1 through 11, further comprising: determining a number of bandwidth part switches based at least in part on the switching parameter, wherein the switch to the second bandwidth part is based at least in part on the number of bandwidth part switches.

Aspect 13: The method of aspect 12, wherein the switching parameter comprises an indication of one or more of: an upper threshold number of bandwidth part switches, a lower threshold number of bandwidth part switches, a fixed number of bandwidth part switches, or a combination thereof.

Aspect 14: The method of any of aspects 1 through 13, further comprising: selecting the second bandwidth part based at least in part on the switching parameter.

Aspect 15: The method of aspect 14, wherein the switching parameter comprises an indication of a bandwidth part priority order, and selecting the second bandwidth part is based at least in part on the bandwidth part priority order.

Aspect 16: The method of any of aspects 14 through 15, wherein the switching parameter comprises an indication of a subband constraint for the second bandwidth part, and selecting the second bandwidth part is based at least in part on the subband constraint.

Aspect 17: The method of aspect 16, wherein the second bandwidth part is wholly in a second subband different than a first subband of the first bandwidth part, a subset of the second bandwidth part is in the second subband different than the first subband of the first bandwidth part, or a combination thereof.

Aspect 18: The method of any of aspects 14 through 17, wherein the switching parameter comprises an indication that switching to a same bandwidth part multiple times is permissible, and selecting the second bandwidth part is based at least in part on the indication.

Aspect 19: The method of aspect 18, further comprising: determining a time threshold for switching to the same bandwidth part, wherein selecting the second bandwidth part is based at least in part on a time between successive switches to the second bandwidth part satisfying the time threshold.

Aspect 20: The method of any of aspects 1 through 19, further comprising: performing one or more listen-before-talk procedures for the second bandwidth part; and switching to a third bandwidth part according to the bandwidth part switching configuration message and the switching parameter based at least in part on a number of failures associated with the one or more listen-before-talk procedures for the second bandwidth part.

Aspect 21: A method for wireless communications at a base station, comprising: transmitting, to a UE, a bandwidth part switching configuration message comprising a switching parameter; receiving, from the UE, a first uplink transmission in a first bandwidth part; and receiving, from the UE, an uplink transmission in a second bandwidth part based at least in part on the switching parameter and an uplink listen-before-talk failure.

Aspect 22: The method of aspect 21, further comprising: receiving, from the UE, a dedicated cause value for a number of uplink listen-before-talk failures for the first bandwidth part in a secondary cell group failure message, wherein the dedicated cause value comprises a number of switched bandwidth parts attempted.

Aspect 23: The method of any of aspects 21 through 22, further comprising: receiving, from the UE, a medium access control (MAC) control element indicating a number of uplink listen-before-talk failures for the first bandwidth part on a primary cell or a secondary cell.

Aspect 24: The method of aspect 23, wherein the MAC control element is received on an additional bandwidth part in a different subband for the secondary cell than the first bandwidth part.

Aspect 25: The method of any of aspects 21 through 24, further comprising: receiving, from a secondary node, an indication of a failure for a primary cell based at least in part on a number of uplink listen-before-talk failures for the first bandwidth part exceeding a threshold value.

Aspect 26: The method of any of aspects 21 through 25, wherein the switching parameter comprises a number of bandwidth part switches, an indication of which bandwidth part can be switched to after a failure of another bandwidth part, a priority order for a plurality of bandwidth parts in the bandwidth part switching configuration message, an indication for switching to a bandwidth part in a different subband, an indication that a same bandwidth part can be used multiple times for switching, a threshold time between switching to the same bandwidth part, or a combination thereof.

Aspect 27: An apparatus for wireless communications at a UE, comprising a processor; memory coupled with the processor; and instructions stored in the memory and executable by the processor to cause the apparatus to perform a method of any of aspects 1 through 20.

Aspect 28: An apparatus for wireless communications at a UE, comprising at least one means for performing a method of any of aspects 1 through 20.

Aspect 29: A non-transitory computer-readable medium storing code for wireless communications at a UE, the code comprising instructions executable by a processor to perform a method of any of aspects 1 through 20.

Aspect 30: An apparatus for wireless communications at a base station, comprising a processor; memory coupled with the processor; and instructions stored in the memory and executable by the processor to cause the apparatus to perform a method of any of aspects 21 through 26.

Aspect 31: An apparatus for wireless communications at a base station, comprising at least one means for performing a method of any of aspects 21 through 26.

Aspect 32: A non-transitory computer-readable medium storing code for wireless communications at a base station, the code comprising instructions executable by a processor to perform a method of any of aspects 21 through 26.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user 53. equipment (UE), comprising:
   one or more processors, one or more memories coupled with the one or more processors; and
   one or more processor-readable instructions stored in the one or more memories and executable by the one or more processors to cause the apparatus to:
   receive, from a network entity, a bandwidth part switching configuration message comprising a switching parameter associated with switching between bandwidth parts after failure of a plurality of listen-before-talk procedures in one or more bandwidth parts of a plurality of bandwidth parts;
   perform the plurality of listen-before-talk procedures for a first bandwidth part of the plurality of bandwidth parts;
   determine that a number of failures of the plurality of listen-before- talk procedures for the first bandwidth part occur on a secondary cell; and
   transmit a medium access control (MAC) control element indicating the number of failures of the plurality of listen-before-talk procedures on the secondary cell.

2. The apparatus of claim 1, wherein the instructions are further executable by the one or more processors to cause the apparatus to:
   perform a random access procedure on a second bandwidth part.

3. The apparatus of claim 2, wherein the instructions are further executable by the one or more processors to cause the apparatus to:
   transmit a first message of the random access procedure;
   determine a threshold number of attempts for transmitting the first message has been satisfied; and
   declare a radio link failure or switching to a third bandwidth part or a combination thereof based at least in part on the threshold number of attempts for transmitting the first message has been satisfied.

4. The apparatus of claim 2, wherein the instructions are further executable by the one or more processors to cause the apparatus to:
- determine a second number of failures of the plurality of listen-before-talk procedures for the second bandwidth part exceeds a threshold value;
- switch to a third bandwidth part based at least in part on the number of failures of the plurality of listen-before-talk procedures for the second bandwidth part exceeding the threshold value; and
- abort the random access procedure on the second bandwidth part.

5. The apparatus of claim 1, wherein the instructions are further executable by the one or more processors to cause the apparatus to:
- determine that the number of failures of the plurality of listen-before-talk procedures for the first bandwidth part occur on a primary secondary cell; and
- transmit a dedicated cause value for the number of failures of the plurality of listen-before-talk procedures for the first bandwidth part in a secondary cell group failure message.

6. The apparatus of claim 5, wherein the dedicated cause value comprises a number of switched bandwidth parts attempted.

7. The apparatus of claim 1, wherein the instructions to transmit the MAC control element are executable by the one or more processors to cause the apparatus to:
- determine the secondary cell comprises the plurality of bandwidth parts that includes the first bandwidth part; and
- transmit the MAC control element on an additional bandwidth part in a different subband for the secondary cell than the first bandwidth part.

8. The apparatus of claim 1, wherein the instructions are further executable by the one or more processors to cause the apparatus to:
- determine to switch to a second bandwidth part based at least in part on the number of failures associated with the plurality of listen-before-talk procedures for the first bandwidth part satisfying a threshold value.

9. The apparatus of claim 1, wherein the instructions are further executable by the one or more processors to cause the apparatus to:
- determine a number of bandwidth part switches based at least in part on the switching parameter.

10. The apparatus of claim 9, wherein the switching parameter comprises an indication of one or more of: an upper threshold number of bandwidth part switches, a lower threshold number of bandwidth part switches, a fixed number of bandwidth part switches, or a combination thereof.

11. The apparatus of claim 1, wherein the instructions are further executable by the one or more processors to cause the apparatus to:
- select a second bandwidth part based at least in part on the switching parameter.

12. The apparatus of claim 11, wherein the switching parameter comprises an indication of a subband constraint for the second bandwidth part, and wherein selecting the second bandwidth part is based at least in part on the subband constraint.

13. The apparatus of claim 11, wherein the switching parameter comprises an indication that switching to a same bandwidth part multiple times is permissible, and wherein selecting the second bandwidth part is based at least in part on the indication.

14. The apparatus of claim 11, wherein the switching parameter comprises an indication of a bandwidth part priority order, and wherein selecting the second bandwidth part is based at least in part on the bandwidth part priority order.

15. The apparatus of claim 1, wherein the instructions are further executable by the one or more processors to cause the apparatus to:
- switch to a second bandwidth part of the plurality of bandwidth parts for uplink communications with the network entity based at least in part on the switching parameter or the number of failures of the plurality of listen-before-talk procedures for the first bandwidth part.

16. A method for wireless communications at a user equipment (UE), comprising:
- receiving, from a network entity, a bandwidth part switching configuration message comprising a switching parameter associated with switching between bandwidth parts after failure of a plurality of listen-before-talk procedures in one or more bandwidth parts of a plurality of bandwidth parts;
- performing the plurality of listen-before-talk procedures for a first bandwidth part of the plurality of bandwidth parts;
- determining that a number of failures of the plurality of listen-before-talk procedures for the first bandwidth part occur on a secondary cell; and
- transmitting a medium access control (MAC) control element indicating the number of failures of the plurality of listen-before-talk procedures on the secondary cell.

17. The method of claim 16, further comprising:
- performing a random access procedure on a second bandwidth part based at least in part on switching to the second bandwidth part;
- transmitting a first message of the random access procedure; and
- declaring a radio link failure based at least in part on a threshold number of listen- before-talk failures has been satisfied.

18. The method of claim 16, wherein transmitting the MAC control element comprises:
- determining the secondary cell comprises the plurality of bandwidth parts that includes the first bandwidth part; and
- transmitting the MAC control element on an additional bandwidth part in a different subband for the secondary cell than the first bandwidth part.

19. The method of claim 16, further comprising:
- determining to switch to a second bandwidth part based at least in part on the number of failures associated with the plurality of listen-before-talk procedures for the first bandwidth part satisfying a threshold value; and
- performing a master cell group recovery procedure via a secondary node based at least in part on a determination that a number of uplink listen-before-talk failures for the second bandwidth part satisfies the threshold value and that the number of uplink listen-before-talk failures for the second bandwidth part occurs on a primary cell.

20. The method of claim 16, further comprising:
- switching to a second bandwidth part of the plurality of bandwidth parts for uplink communications with the network entity based at least in part on the switching parameter or the number of failures of the plurality of listen-before-talk procedures for the first bandwidth part.

21. An apparatus for wireless communications at a network entity, comprising:
- one or more processors, one or more memories coupled with the one or more processors; and
- one or more processor-readable instructions stored in the one or more memories and executable by the one or more processors to cause the apparatus to:
- transmit, to a UE, a bandwidth part switching configuration message comprising a switching parameter associated with switching between bandwidth parts after failure of a plurality of listen-before-talk procedures in one or more bandwidth parts of a plurality of bandwidth parts; and
- receive, from the UE, a medium access control (MAC) control element indicating a number of failures of the plurality of listen-before-talk procedures, wherein the number of failures of the plurality of listen-before-talk procedures determined for a first bandwidth part occur on a secondary cell.

22. The apparatus of claim 21, wherein the instructions are further executable by the one or more processors to cause the apparatus to:
- receive, from the UE, a first uplink transmission in the first bandwidth part of the plurality of bandwidth parts; and
- receive, from the UE, an uplink transmission in a second bandwidth part of the plurality of bandwidth parts based at least in part on the switching parameter or the number of failures of the plurality of listen-before-talk procedures for the first bandwidth part.

* * * * *